United States Patent
Kim et al.

(10) Patent No.: US 11,709,567 B2
(45) Date of Patent: Jul. 25, 2023

(54) DISPLAY DEVICE INCLUDING AN INPUT SENSING PART

(71) Applicant: SAMSUNG DISPLAY CO., LTD., Yongin-si (KR)

(72) Inventors: Janghui Kim, Suwon-si (KR); Jaewon Kim, Seoul (KR); Innam Lee, Seoul (KR); Choonhyop Lee, Anyang-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/651,141

(22) Filed: Feb. 15, 2022

(65) Prior Publication Data

US 2022/0413697 A1 Dec. 29, 2022

(30) Foreign Application Priority Data

Jun. 29, 2021 (KR) .......... 10-2021-0085100

(51) Int. Cl.
*G06F 3/041* (2006.01)
*G06F 3/044* (2006.01)

(52) U.S. Cl.
CPC ...... *G06F 3/041662* (2019.05); *G06F 3/0446* (2019.05)

(58) Field of Classification Search
CPC .......... G06F 3/041662; G06F 3/0446
See application file for complete search history.

(56) References Cited

U.S. PATENT DOCUMENTS

| | | | |
|---|---|---|---|
| 2015/0145802 A1* | 5/2015 | Yao | G06F 3/041662 345/174 |
| 2015/0162932 A1* | 6/2015 | Page | G06F 3/04883 341/163 |
| 2016/0342274 A1* | 11/2016 | Ye | G06F 3/041662 |
| 2017/0308200 A1* | 10/2017 | Mugiraneza | H03K 17/962 |
| 2018/0253167 A1* | 9/2018 | Park | G06F 3/04883 |
| 2020/0019269 A1* | 1/2020 | Jeon | G06F 3/041662 |
| 2020/0326828 A1* | 10/2020 | Otagaki | G06F 3/0446 |
| 2021/0004135 A1 | 1/2021 | Kim et al. | |
| 2021/0313401 A1 | 10/2021 | Lee et al. | |

FOREIGN PATENT DOCUMENTS

| | | |
|---|---|---|
| KR | 102057050 | 12/2019 |
| KR | 1020210003986 | 1/2021 |
| KR | 1020210017598 | 2/2021 |
| KR | 1020210123454 | 10/2021 |

* cited by examiner

*Primary Examiner* — Md Saiful A Siddiqui
(74) *Attorney, Agent, or Firm* — F. Chau & Associates, LLC

(57) ABSTRACT

A display device includes a display panel and an input sensing part disposed on the display panel. The input sensing part includes first sensing electrodes extending in a first direction and arranged in a second direction crossing the first direction, first lines connected to the first sensing electrodes, second sensing electrodes extending in the second direction and arranged in the first direction, and second lines connected to the second sensing electrodes. The second lines include second-first lines defined as j-th to k-th second lines, and the first lines are connected to the second-first lines.

20 Claims, 21 Drawing Sheets

DISPLAY DEVICE INCLUDING AN INPUT SENSING PART

CROSS-REFERENCE TO RELATED APPLICATION

This U.S. non-provisional patent application claims priority under 35 U.S.C. § 119 to Korean Patent Application No. 10-2021-0085100, filed on Jun. 29, 2021, the contents of which are hereby incorporated by reference in its entirety.

TECHNICAL FIELD

The present disclosure relates to a display device and, more specifically, to a display device including an input sensing part.

DISCUSSION OF THE RELATED ART

Electronic devices that display images to a user, such as a smart phone, a digital camera, a notebook computer, a navigation unit, and a smart television, generally include a display device to display the images. The display device includes a display panel generating the images, an input device such as an input sensor, a camera element, and various other sensors.

The input sensor is disposed on the display panel and is configured to sense a user's touch to the display panel. The camera is configured to take pictures. The various other sensors may include a fingerprint sensor, a proximity sensor, an illumination sensor, etc.

The fingerprint sensor may read a fingerprint provided to the display panel. The proximity sensor senses an object approaching the display device. The proximity sensor may include a light emitting portion that generates light, e.g., an infrared light, and outputs the light. The proximity sensor may also include a light receiving portion that senses the output light that is reflected by an external object. The illumination sensor senses an ambient luminance around the display device. The fingerprint sensor, the proximity sensor, and the illumination sensor are each manufactured as separate modules and disposed in the display device.

SUMMARY

A display device includes a display panel and an input sensing part disposed on the display panel. The input sensing part includes a plurality of first sensing electrodes each extending in a first direction and arranged in a second direction crossing the first direction, a plurality of first lines each connected to the first sensing electrodes, a plurality of second sensing electrodes each extending in the second direction and arranged in the first direction, and a plurality of second lines each connected to the second sensing electrodes. The second lines include a plurality of second-first lines defined as j-th to k-th second lines, and the first lines are connected to the second-first lines.

A display device includes a display panel and an input sensing part disposed on the display panel. The input sensing part includes a plurality of first sensing electrodes each extending in a first direction and arranged in a second direction crossing the first direction, a plurality of first lines each connected to the first sensing electrodes, a plurality of second sensing electrodes each extending in the second direction and arranged in the first direction, and a plurality of second lines each connected to the second sensing electrodes. Among the first lines, g first lines are respectively connected to g second lines among the second lines, where g is a positive integer.

A display device includes a display panel and an input sensing part disposed on the display panel. The input sensing part includes a plurality of first sensing electrodes each extending in a first direction and arranged in a second direction crossing the first direction and a plurality of second sensing electrodes each extending in the second direction, arranged in the first direction, and insulated from the first sensing electrodes while crossing the first sensing electrodes. The second sensing electrodes includes a plurality of second-first sensing electrodes disposed in a first area and a plurality of second-second sensing electrodes disposed in a second area adjacent to the first area. Driving signals are substantially simultaneously applied to the first sensing electrodes and the second-second sensing electrodes in a proximity sensing mode, and the driving signals are not applied to the second-first sensing electrodes in the proximity sensing mode.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Figure 1:
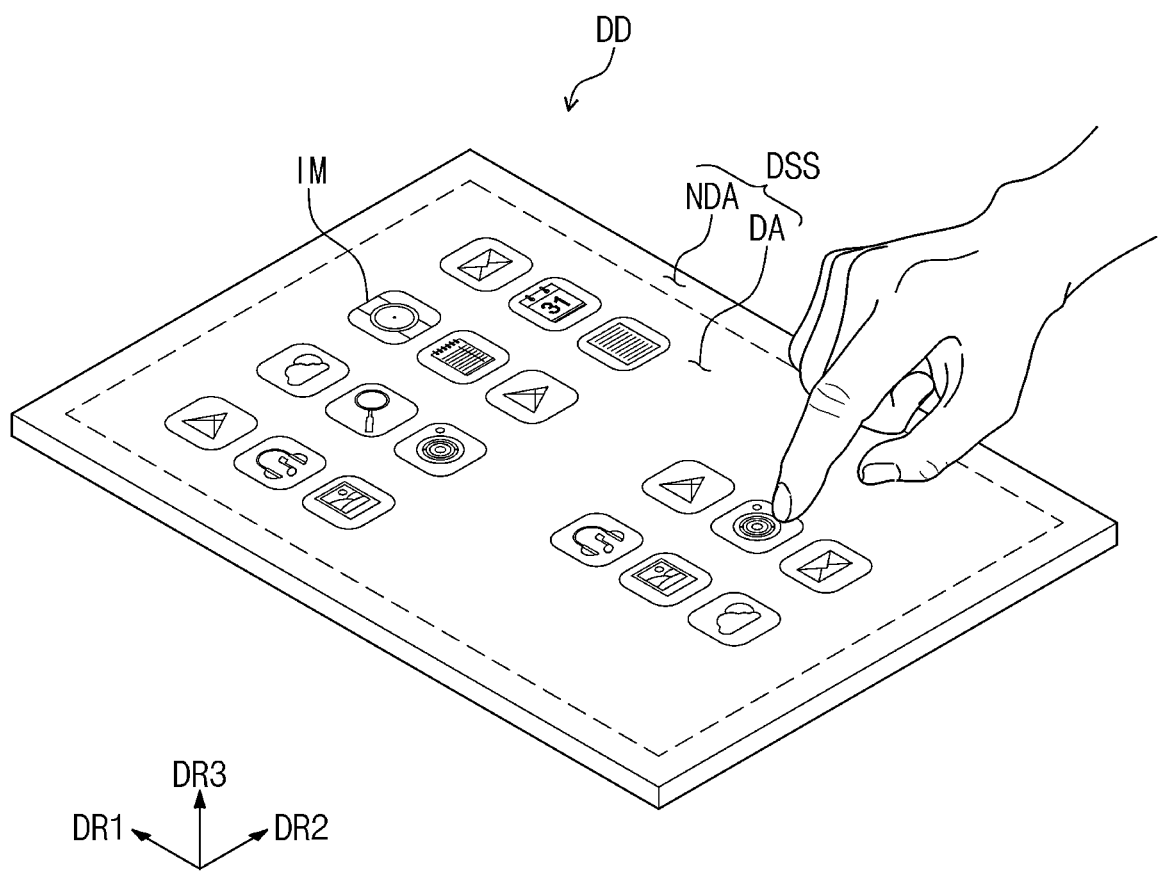
FIG. 1 is a perspective view showing a display device according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals may refer to like elements throughout the specification and the drawings. In the drawings, various thicknesses, lengths, and angles are shown and while the arrangement shown does indeed represent an embodiment of the present disclosure, it is to be understood that modifications of the various thicknesses, lengths, and angles may be possible within the spirit and scope of the present disclosure and the present disclosure is not necessarily limited to the particular thicknesses, lengths, and angles shown.

It will be understood that, although the terms first, second, etc. may be used herein to describe various elements, these elements should not necessarily be limited by these terms. These terms are used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "comprises," "comprising," "includes," and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

FIG. 1 is a perspective view showing a display device DD according to an embodiment of the present disclosure.

Referring to FIG. 1, the display device DD may have a substantially rectangular shape defined by a pair of long sides extending in a first direction DR1 and a pair of short sides extending in a second direction DR2 crossing the first direction DR1. However, the shape of the display device DD is not necessarily limited to the rectangular shape, and the display device DD may have various shapes, such as a circular shape, a polygonal shape, or a shape of a rectangle with rounded corners.

Hereinafter, a direction substantially perpendicular to a plane defined by the first direction DR1 and the second direction DR2 may be referred to as a third direction DR3.

In the present disclosure, the expression "when viewed in a plane" or "in a plan view" may mean a state of being viewed in the third direction DR3.

An upper surface of the display device DD may be referred to as a display surface DSS and may be a planar surface defined by the first direction DR1 and the second direction DR2. Images IM generated by the display device DD may be provided to a user through the display surface DSS.

The display surface DSS may include a display area DA and a non-display area NDA at least partially surrounding the display area DA. The display area DA may display the images, and the non-display area NDA might not display the images. The non-display area NDA may surround the display area DA and may define an edge of the display device DD, which is printed in a predetermined color.

The display device DD may be applied to a large-sized electronic item, such as a television set, a computer monitor, or an outdoor billboard, and a small and medium-sized electronic item, such as a personal computer, a notebook computer, a personal digital assistant, a car navigation unit, a game console, a smartphone, a tablet computer, and a camera. However, these are merely examples, and thus, the display device DD may be applied to various other electronic devices as well.

Figure 2:
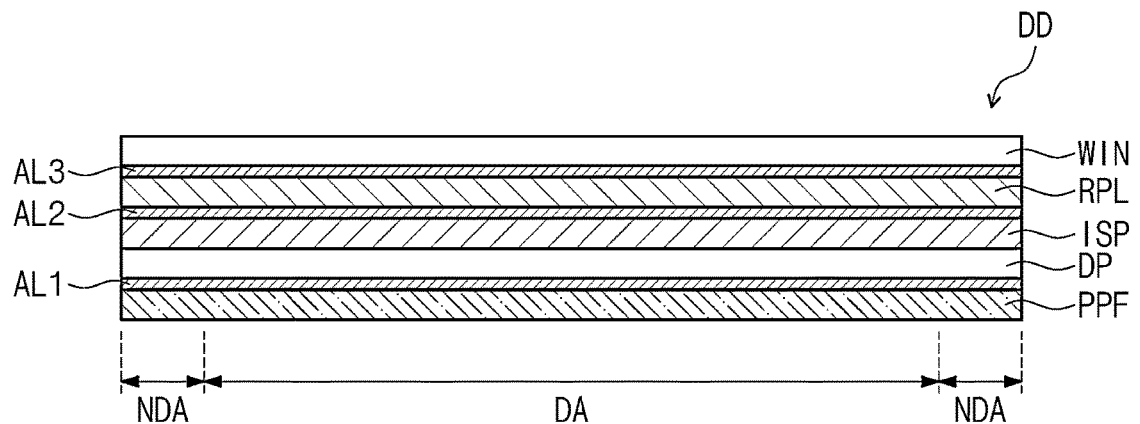
FIG. 2 is a cross-sectional view showing the display device shown in FIG. 1.
Figure 2:
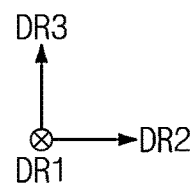

FIG. 2 is a cross-sectional view showing the display device DD shown in FIG. 1.

As an example, FIG. 2 shows a cross-section of the display device DD when viewed in the first direction DR1.

Referring to FIG. 2, the display device DD may include a display panel DP, an input sensing part ISP, an anti-reflective layer RPL, a window WIN, a panel protective film PPF, and first, second, and third adhesive layers AL1, AL2, and AL3.

The display panel DP may be a flexible display panel. The display panel DP may be a light-emitting type display panel, however, the present invention is not necessarily limited to this configuration. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot or a quantum rod. Hereinafter, the organic light emitting display panel will be described as a representative example of the display panel DP.

The input sensing part ISP may be disposed on the display panel DP. The input sensing part ISP may include a plurality of sensing portions to sense an external input by a capacitive method. The input sensing part ISP may be manufactured directly on the display panel DP when the display device DD is manufactured, however, the present invention is not necessarily limited to this approach. According to an embodiment, the input sensing part ISP may be attached to the display panel DP by an adhesive layer after being separately manufactured from the display panel DP.

The anti-reflective layer RPL may be disposed on the input sensing part ISP. The anti-reflective layer RPL may be defined as an external light reflection preventing film. The anti-reflective layer RPL may reduce a reflectance of an external light incident to the display panel DP from the above of the display device DD.

In a case where the display panel DP reflects the external light incident thereto like a mirror and the reflected external light is provided to the user, the user may perceive the external light. The anti-reflective layer RPL may include a plurality of color filters that displays the same colors as pixels to prevent the external light from being reflected and perceived by the user.

The color filters may filter the external light to allow the external light to have the same color as the colors displayed by the pixels. In this case, the external light might not be perceived by the user, however, the present disclosure is not necessarily limited thereto or thereby. According to an embodiment, the anti-reflective layer RPL may include a retarder and/or a polarizer to reduce the reflectance of the external light.

The window WIN may be disposed on the anti-reflective layer RPL. The window WIN may protect the display panel DP, the input sensing part ISP, and the anti-reflective layer RPL from external scratches and impacts.

The panel protective film PPF may be disposed under the display panel DP. The panel protective film PPF may protect a lower portion of the display panel DP. The panel protective film PPF may include a flexible plastic material such as polyethylene terephthalate (PET).

The first adhesive layer AL1 may be disposed between the display panel DP and the panel protective film PPF. The display panel DP and the panel protective film PPF may be coupled to each other by the first adhesive layer AL1. The second adhesive layer AL2 may be disposed between the anti-reflective layer RPL and the input sensing part ISP. The anti-reflective layer RPL and the input sensing part ISP may be coupled to each other by the second adhesive layer AL2. The third adhesive layer AL3 may be disposed between the window WIN and the anti-reflective layer RPL. The window WIN and the anti-reflective layer RPL may be coupled to each other by the third adhesive layer AL3.

Figure 3:
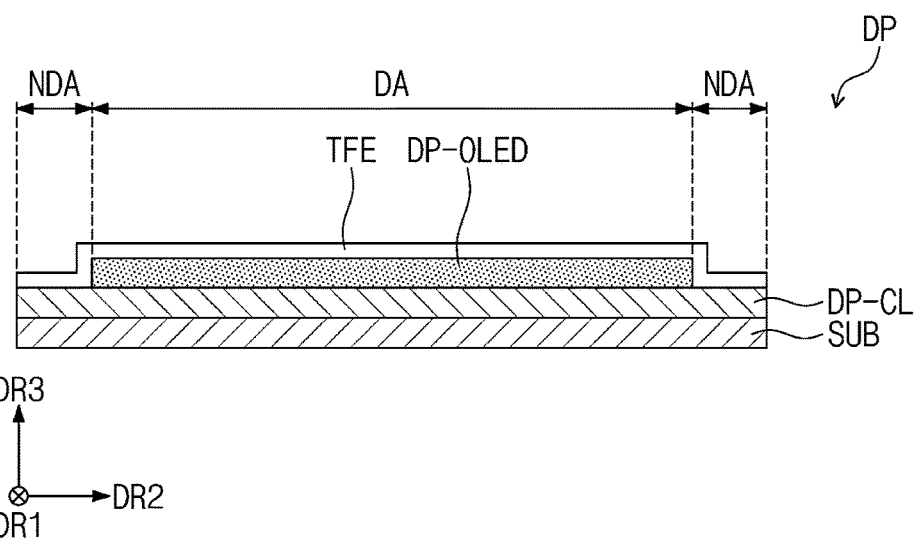
FIG. 3 is a cross-sectional view showing a display panel shown in FIG. 2.
Figure 3:
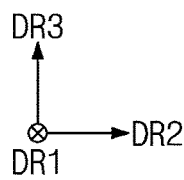

FIG. 3 is a cross-sectional view showing the display panel DP shown in FIG. 2.

As an example, FIG. 3 shows a cross-section of the display panel DP when viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include the display area DA and the non-display area NDA around the display area DA. The substrate SUB may include a glass material or a flexible plastic material such as polyimide (PI). The display element layer DP-OLED may be disposed in the display area DA.

A plurality of pixels may be disposed in the circuit element layer DP-CL and the display element layer DP-OLED. Each pixel may include a transistor disposed on the circuit element layer DP-CL and a light emitting element disposed on the display element layer DP-OLED and connected to the transistor. The pixel will be described in detail later.

The thin film encapsulation layer TFE may be disposed on the circuit element layer DP-CL to cover the display element layer DP-OLED. The thin film encapsulation layer TFE may protect the pixels from moisture, oxygen, and foreign substances.

Figure 4:
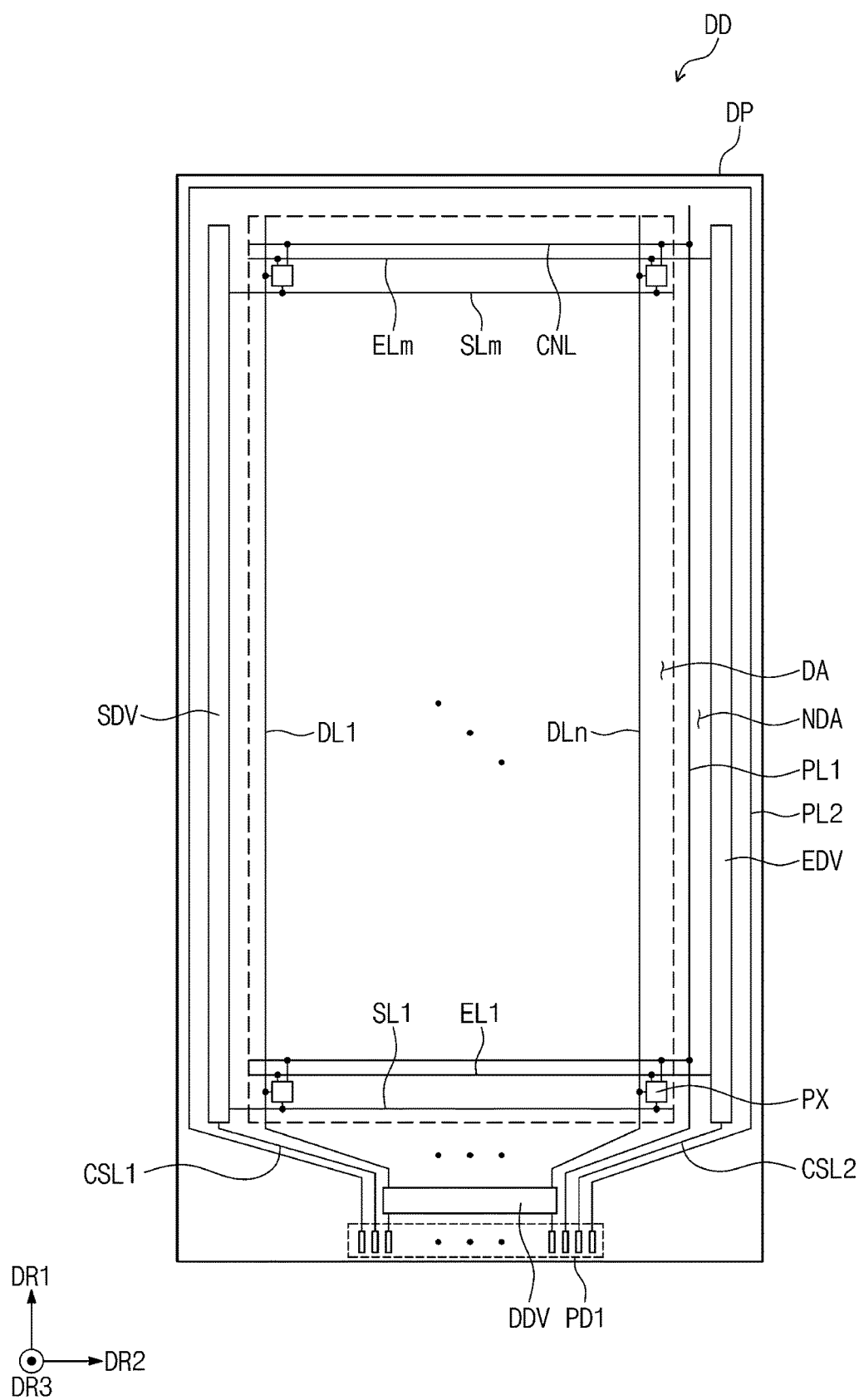
FIG. 4 is a plan view showing the display panel shown in FIG. 2.

FIG. 4 is a plan view showing the display panel DP shown in FIG. 2.

Referring to FIG. 4, the display device DD may include the display panel DP, a scan driver SDV, a data driver DDV, an emission driver EDV, and a plurality of first pads PDL.

The display panel DP may have a rectangular shape having a pair of long sides extending in the first direction DR1 and a pair of short sides extending in the second direction DR2, however, the shape of the display panel DP should not necessarily be limited thereto or thereby. The display panel DP may include the display area DA and the non-display area NDA at least partially surrounding the display area DA.

The display panel DP may include a plurality of pixels PX, a plurality of scan lines SL1 to SLm, a plurality of data lines DL1 to DLn, a plurality of emission lines EL1 to Elm, first and second control lines CSL1 and CSL2, first and second power lines PL1 and PL2, and connection lines CNL, where each of "m" and "n" is a positive integer.

The pixels PX may be arranged in the display area DA. The scan driver SDV and the emission driver EDV may be disposed in the non-display area NDA respectively adjacent to the long sides of the display panel DP. The data driver DDV may be disposed in the non-display area NDA and may be adjacent to one short side of the short sides of the display panel DP. When viewed in a plane, the data driver DDV may be adjacent to a lower end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may extend in the second direction DR2 and may be connected to the pixels PX and the emission driver EDV.

The first power line PL1 may extend in the first direction DR1 and may be disposed in the non-display area NDA. The first power line PL1 may be disposed between the display area DA and the emission driver EDV, however, the present invention is not necessarily limited thereto or thereby. According to an embodiment, the first power line PL1 may be disposed between the display area DA and the scan driver SDV.

The connection lines CNL may extend in the second direction DR2 and may be arranged in the first direction DR1. The connection lines CNL may be connected to the first power line PL1 and the pixels PX. A first voltage may be applied to the pixels PX through the first power line PL1 and the connection lines CNL connected to the first power line PL1.

The second power line PL2 may be disposed in the non-display area NDA. The second power line PL2 may extend along the long sides of the display panel DP and the other short side at which the data driver DDV is not disposed in the display panel DP. The second power line PL2 may be disposed outside the scan driver SDV and the emission driver EDV.

The second power line PL2 may extend to the display area DA and may be connected to the pixels PX. A second voltage having a level lower than that of the first voltage may be applied to the pixels PX through the second power line PL2.

The first control line CSL1 may be connected to the scan driver SDV and may extend toward the lower end of the display panel DP. The second control line CSL2 may be connected to the emission driver EDV and may extend toward the lower end of the display panel DP. The data driver DDV may be disposed between the first control line CSL1 and the second control line CSL2.

The first pads PD1 may be disposed in the non-display area NDA adjacent to the lower end of the display panel DP. The first pads PD1 may be disposed closer to the lower end of the display panel DP than the data driver DDV is. The data driver DDV, the first power line PL1, the second power line PL2, the first control line CSL1, and the second control line CSL2 may be connected to the first pads PD1. The data lines DL1 to DLn may be connected to the data driver DDV, and the data driver DDV may be connected to the first pads PD1 corresponding to the data lines DL1 to DLn.

The display device DD may further include a timing controller to control an operation of the scan driver SDV, the data driver DDV, and the emission driver EDV and a voltage generator to generate the first and second voltages. The timing controller and the voltage generator may be connected to corresponding first pads PD1 through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The emission driver EDV may generate a plurality of emission signals, and the emission signals may be applied to the pixels PX through the emission lines EL1 to ELm.

The pixels PX may receive the data voltages in response to the scan signals. The pixels PX may emit light having a luminance corresponding to the data voltages in response to the emission signals, and thus, the images may be displayed.

Figure 5:
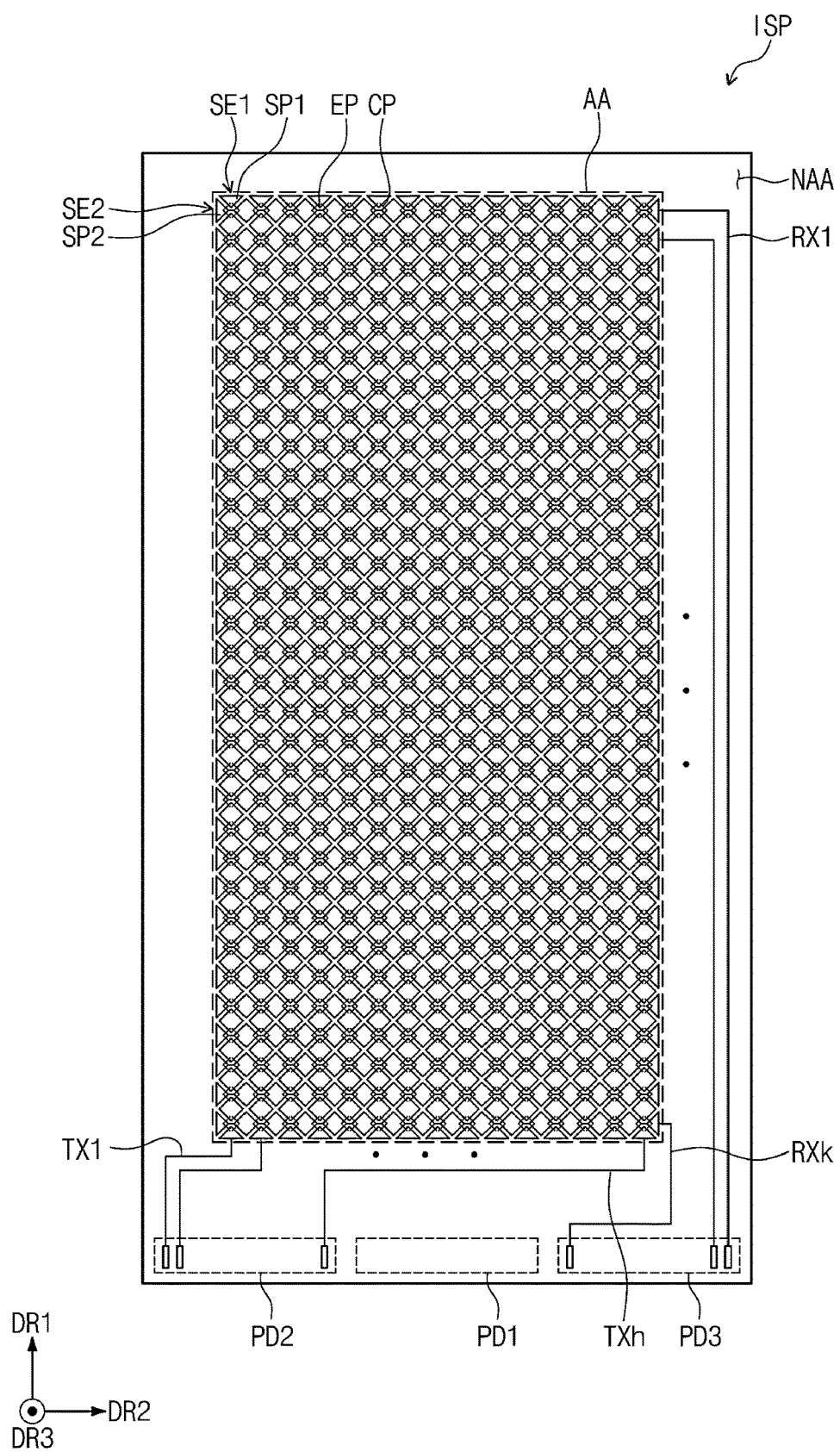
FIG. 5 is a plan view showing an input sensing part shown in FIG. 2.

FIG. 5 is a plan view showing the input sensing part ISP shown in FIG. 2.

Referring to FIG. 5, the input sensing part ISP may include a plurality of sensing electrodes SE1 and SE2, a plurality of lines TX1 to TXh and RX1 to RXk, and a plurality of second and third pads PD2 and PD3. The sensing electrodes SE1 and SF2, the lines TX1 to TXh and RX1 to RXk, and the second and third pads PD2 and PD3 may be disposed on the thin film encapsulation layer TFE.

A flat area of the input sensing part ISP may include an active area AA and a non-active area NAA at least partially surrounding the active area AA. The active area AA may overlap the display area DA, and the non-active area NAA may overlap the non-display area NDA.

The sensing electrodes SE1 and SE2 may be disposed in the active area AA, and the second and third pads PD2 and PD3 may be disposed in the non-active area NAA. The second pads PD2 and the third pads PD3 may be disposed adjacent to a lower end of the input sensing part ISP when viewed in a plane. The first pads PD1 may be disposed between the second pads PD2 and the third pads PD3 when viewed in a plane.

The lines TX1 to TXh and RX1 to RXk may be connected to one ends of the sensing electrodes SE1 and SE2, may extend to the non-active area NAA, and may be connected to the second and third pads PD2 and PD3. A sensing controller may be connected to the second and third pads PD2 and PD3 via a printed circuit board to control the input sensing part ISP.

The sensing electrodes SE1 and SE2 may include a plurality of first sensing electrodes SE1 extending in the first direction DR1 and arranged in the second direction DR2 and a plurality of second sensing electrodes SE2 extending in the second direction DR2 and arranged in the first direction DR1. The second sensing electrodes SE2 may be insulated from the first sensing electrodes SE1 while crossing the first sensing electrodes SE1.

The lines TX1 to TXh and RX1 to RXk may include a plurality of first lines TX1 to TXh connected to the first sensing electrodes SE1 and a plurality of second lines RX1 to RXk SNL2 connected to the second sensing electrodes SE2. The first lines TX1 to TXh may extend to the non-active area NAA and may be connected to the second pads PD2. The second lines RX1 to RXk may extend to the non-active area NAA and may be connected to the third pads PD3.

As an example, the first lines TX1 to TXh may be disposed in the non-active area NAA adjacent to a lower side of the active area AA when viewed in plane. In addition, the second lines RX1 to RXk may be disposed in the non-active area NAA adjacent to a right side of the active area AA when viewed in plane.

Each of the first sensing electrodes SE1 may include a plurality of first sensing portions SP1 arranged in the first direction DR1 and a plurality of connection patterns CP connecting the first sensing portions SP1. Each of the connection patterns CP may be disposed between two first sensing portions SP1 adjacent to each other in the first direction DR1 and may connect the two first sensing portions SP1.

Each of the second sensing electrodes SE2 may include a plurality of second sensing portions SP2 arranged in the second direction DR2 and a plurality of extension patterns EP extending from the second sensing portions SP2. Each of the extension patterns EP may be disposed between two second sensing portions SP2 adjacent to each other in the second direction DR2 and may extend from the two second sensing portions SP2.

The first sensing portions SP1 might not overlap the second sensing portions SP2, may be spaced apart from the second sensing portions SP2, and may be alternately arranged with the second sensing portions SP2. A capacitance may be formed by the first sensing portions SP1 and the second sensing portions SP2. The extension patterns EP might not overlap the connection patterns CP.

The first and second sensing electrodes SE1 and SE2 may be formed of silver, gold, copper, aluminum, platinum, palladium, chromium, titanium, tungsten, niobium, tantalum, vanadium, iron, manganese, cobalt, nickel, zinc, tin, molybdenum, or alloys thereof.

Figure 6:
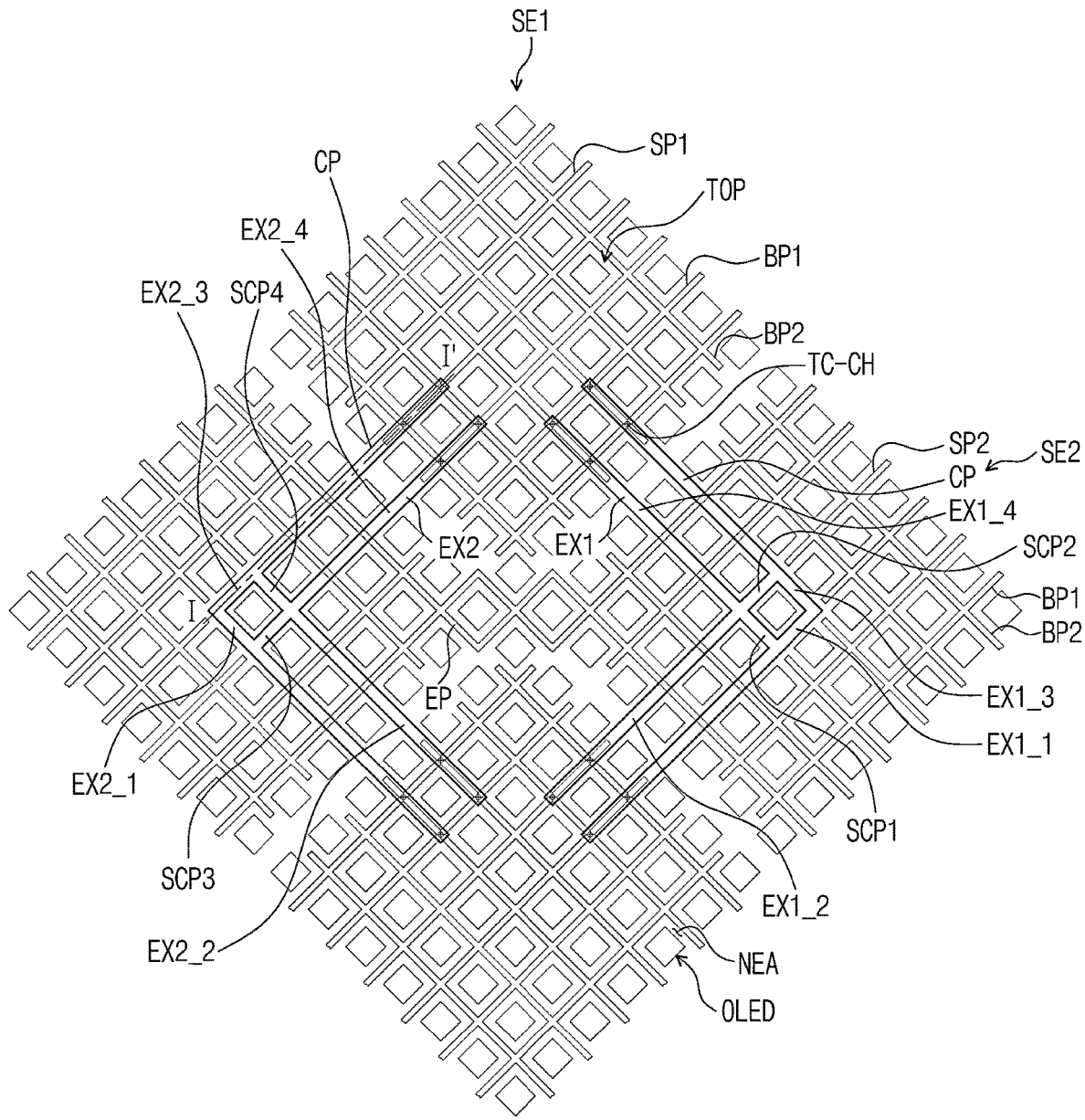
FIG. 6 is an enlarged plan view showing two first sensing portions adjacent to each other and two second sensing portions adjacent to each other shown in FIG. 5.
Figure 6:
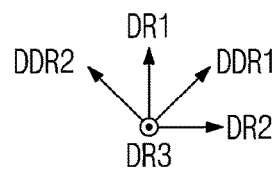

FIG. 6 is an enlarged plan view showing two first sensing portions SP1 adjacent to each other and two second sensing portions SP2 adjacent to each other shown in FIG. 5.

Referring to FIG. 6, the first sensing portions SP1 and the second sensing portions SP2 may have a mesh shape. Each of the first and second sensing portions SP1 and SP2 may include a plurality of first branch portions BP1 extending in a first diagonal direction DDR1 and a plurality of second branch portions BP2 extending in a second diagonal direction DDR2 to have the mesh shape.

The first diagonal direction DDR1 may be defined as a direction crossing the first and second directions DR1 and DR2 on the plane defined by the first and second directions DR1 and DR2. The second diagonal direction DDR2 may be defined as a direction crossing the first diagonal direction DDR1 on the plane defined by the first and second directions DR1 and DR2. As an example, the first direction DR1 and the second direction DR2 may be substantially perpendicular to each other, and the first diagonal direction DDR1 and the second diagonal direction DDR2 may be substantially perpendicular to each other.

The first branch portions BP1 of each of the first and second sensing portions SP1 and SP2 may cross the second branch portions BP2 of each of the first and second sensing portions SP1 and SP2 and may be integrally formed with the second branch portions BP2 of each of the first and second sensing portions SP1 and SP2. Touch openings TOP each having a lozenge shape may be defined by the first branch portions BP1 and the second branch portions BP2.

The pixels PX shown in FIG. 4 may include light emitting elements OLED that each generate light. When viewed in a plane, the light emitting elements OLED may be respectively disposed in the touch openings TOP. The first and second branch portions BP1 and BP2 may be disposed between the light emitting elements OLED. An area between the light emitting elements OLED may be defined as a non-light emitting-area NEA.

The first and second sensing portions SP1 and SP2 may be disposed in the non-light-emitting area NEA. Since the first and second sensing portions SP1 and SP2 are disposed in the non-light-emitting area NEA, the light generated by the light emitting elements OLED may be normally emitted without being influenced by the first and second sensing portions SP1 and SP2.

The connection pattern CP may extend so as not to overlap the extension pattern EP and may connect the first sensing portions SP1. The connection pattern CP may be connected to the first sensing portions SP1 via a plurality of contact holes TC-CH. A structure of the contact holes TC-CH will be shown in FIG. 7. The connection pattern CP may extend toward the first sensing portions SP1 via areas overlapping the second sensing portions SP2.

The extension pattern EP may be disposed between the first sensing portions SP1 and may extend from the second sensing portions SP2. The second sensing portions SP2 may be formed integrally with the extension pattern EP. The extension pattern EP may have the mesh shape. The extension pattern EP, the first sensing portions SP1, and the second sensing portions SP2 may be disposed on a same layer as each other and may be formed by patterning a same material.

The connection pattern CP may include a first extension portion EX1 and a second extension portion EX2 having a shape that is symmetrical with that of the first extension portion EX1. The extension pattern EP may be disposed between the first extension portion EX1 and the second extension portion EX2. The first extension portion EX1 may extend via an area overlapping one second sensing portion SP2 among the second sensing portions SP2 and may be connected to the first sensing portions SP1. The second extension portion EX2 may extend via an area overlapping another second sensing portion SP2 among the second sensing portions SP2 and may be connected to the first sensing portions SP1.

Hereinafter, the first sensing portions SP1 may be defined as an upper first sensing portion SP1 and a lower first sensing portion SP1 according to a relative position. In addition, the second sensing portions SP2 may be defined as a left second sensing portion SP2 and a right second sensing portion SP2 according to a relative position.

Predetermined portions of the first and second extension portions EX1 and EX2, which are adjacent to one sides of the first and second extension portions EX1 and EX2, may be connected to the lower first sensing portion SP1 via the contact holes TC-CH. Predetermined portions of the first and second extension portions EX1 and EX2, which are adjacent to the other sides of the first and second extension portions EX1 and EX2, may be connected to the upper first sensing portion SP1 via the contact holes TC-CH.

The first extension portion EX1 may include a first sub-extension portion EX1_1 and a second sub-extension portion EX1_2, which extend in the first diagonal direction DDR1, a third sub-extension portion EX1_3 and a fourth sub-extension portion EX1_4, which extend in the second diagonal direction DDR2, a first sub-conductive pattern SCP1 extending in the second diagonal direction DDR2, and a second sub-conductive pattern SCP2 extending in the first diagonal direction DDR1.

Predetermined portions of the first and second sub-extension portions EX1_1 and EX1_2, which are adjacent to one sides of the first and second sub-extension portions EX1_1 and EX1_2, may be connected to the lower first sensing portion SP1 via the contact holes TC-CH. Predetermined portions of the third and fourth sub-extension portions EX1 . . . 3 and EX1_4, which are adjacent to one sides of the third and fourth sub-extension portions EX1_3 and EX1_4, may be connected to the upper first sensing portion SP1 via the contact holes TC-CH.

The other side of the first sub-extension portion EX1_1 may extend from the other side of the third sub-extension portion EX1_3, and the other side of the second sub-extension portion EX1_2 may extend from the other side of the fourth sub-extension portion EX1_4. The first sub-conductive pattern SCP1 may extend from the other side of the fourth sub-extension portion EX1_4 in the second diagonal direction DDR2 and may extend to the first sub-extension portion EX1_1. The second sub-conductive pattern SCP2 may extend from the other side of the second sub-extension portion EX1_2 in the first diagonal direction DDR1 and may extend to the third sub-extension portion EX1_3.

The first sub-extension portion EX1_1, the second sub-extension portion EX1_2, the third sub-extension portion EX1_3, the fourth sub-extension portion EX1_4, the first sub-conductive pattern SCP1, and the second sub-conductive pattern SCP2 may be integrally formed with each other as a single continuous structure.

The first and second sub-extension portions EX1_1 and EX1_2 may cross some second branch portions BP2 adjacent to the lower first sensing portion SP1 among the second branch portions BP2 of the right second sensing portion SP2. The first branch portions BP1 of the right second sensing portion SP2 might not be disposed in some areas overlapping the first and second sub-extension portions EX1_1 and EX1_2 and the second sub-conductive pattern SCP2.

The third and fourth sub-extension portions EX1_3 and EX1_4 may cross some first branch portions BP1 adjacent to the upper first sensing portion SP1 among the first branch portions BP1 of the right second sensing portion SP2. The second branch portions BP2 of the right second sensing portion SP2 might not be disposed in some areas overlapping the third and fourth sub-extension portions EX1_3 and EX1_4 and the first sub-conductive pattern SCP1.

The second extension portion EX2 may include a fifth sub-extension portion EX2_1 and a sixth sub-extension portion EX2_2, which extend in the second diagonal direction DDR2, a seventh sub-extension portion EX2_3 and an eighth sub-extension portion EX2_4, which extend in the first diagonal direction DDR1, a third sub-conductive pattern SCP3 extending in the first diagonal direction DDR1, and a fourth sub-conductive pattern SCP4 extending in the second diagonal direction DDR2.

The left second sensing portion SP2 may have a structure that is symmetrical with that of the right second sensing portion SP2, and the second extension portion EX2 may have a structure that is symmetrical with that of the first extension portion EX1. Accordingly, to the extent that a detailed descriptions of the fifth to eighth sub-extension portions EX2_1 to EX2_4 and the third and fourth sub-conductive patterns SCP3 and SCP4 is omitted, it may be assumed that these elements are at least similar to corresponding elements described elsewhere within the present disclosure.

Figure 7:
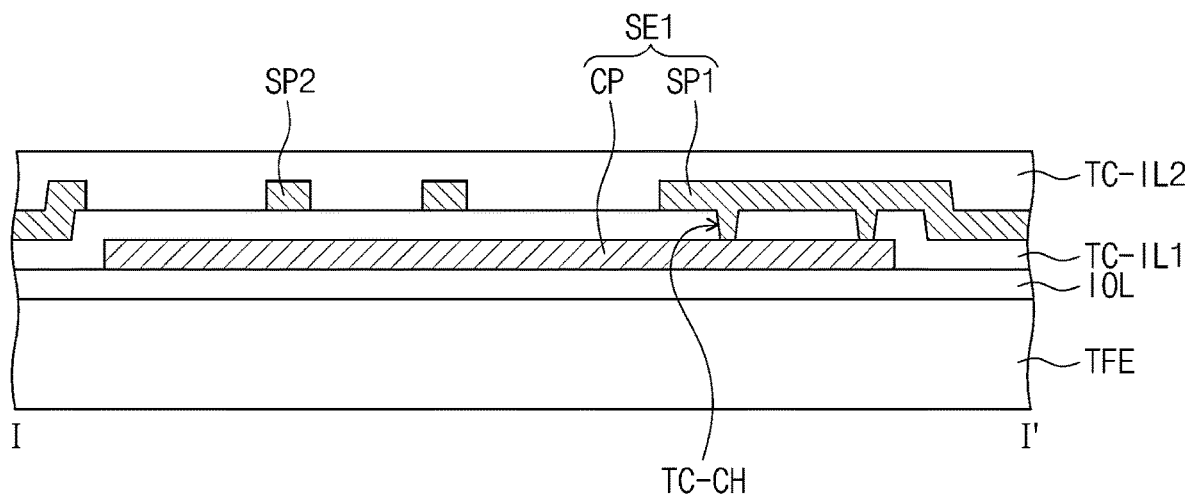
FIG. 7 is a cross-sectional view taken along a line I-I' shown in FIG. 6.

FIG. 7 is a cross-sectional view taken along a line I-I' shown in FIG. 6.

Referring to FIG. 7, an insulating layer IOL may be disposed on the thin film encapsulation layer TFE. The insulating layer IOL may include an inorganic insulating layer. At least one insulating layer IOL may be disposed on the thin film encapsulation layer TFE. As an example, two inorganic insulating layers IOL may be sequentially stacked on the thin film encapsulation layer TFE.

The connection pattern CP may be disposed on the insulating layer IOL. A first insulating layer TC-IL1 may be disposed on the connection pattern CP and the insulating layer IOL. The first insulating layer TC-IL1 may be disposed on the insulating layer IOL and may cover the connection pattern CP. The first insulating layer TC-IL1 may include an inorganic insulating layer and/or an organic insulating layer.

The first sensing portions SP1 and the second sensing portions SP2 may be disposed on the first insulating layer TC-IL1. The extension pattern EP formed integrally with the second sensing portions SP2 and may also be disposed on the first insulating layer TC-IL1. The connection pattern CP may be connected to the first sensing portions SP1 via the contact holes TC-CH defined through the first insulating layer TC-IL1.

A second insulating layer TC-IL2 may be disposed on the first and second sensing portions SP1 and SP2 and the first insulating layer TC-IL1. The second insulating layer TC-IL2 may be disposed on the first insulating layer TC-IL1 and may cover the first sensing portions SP1 and the second sensing portions SP2. The second insulating layer TC-IL2 may include an organic insulating layer.

Figure 8:
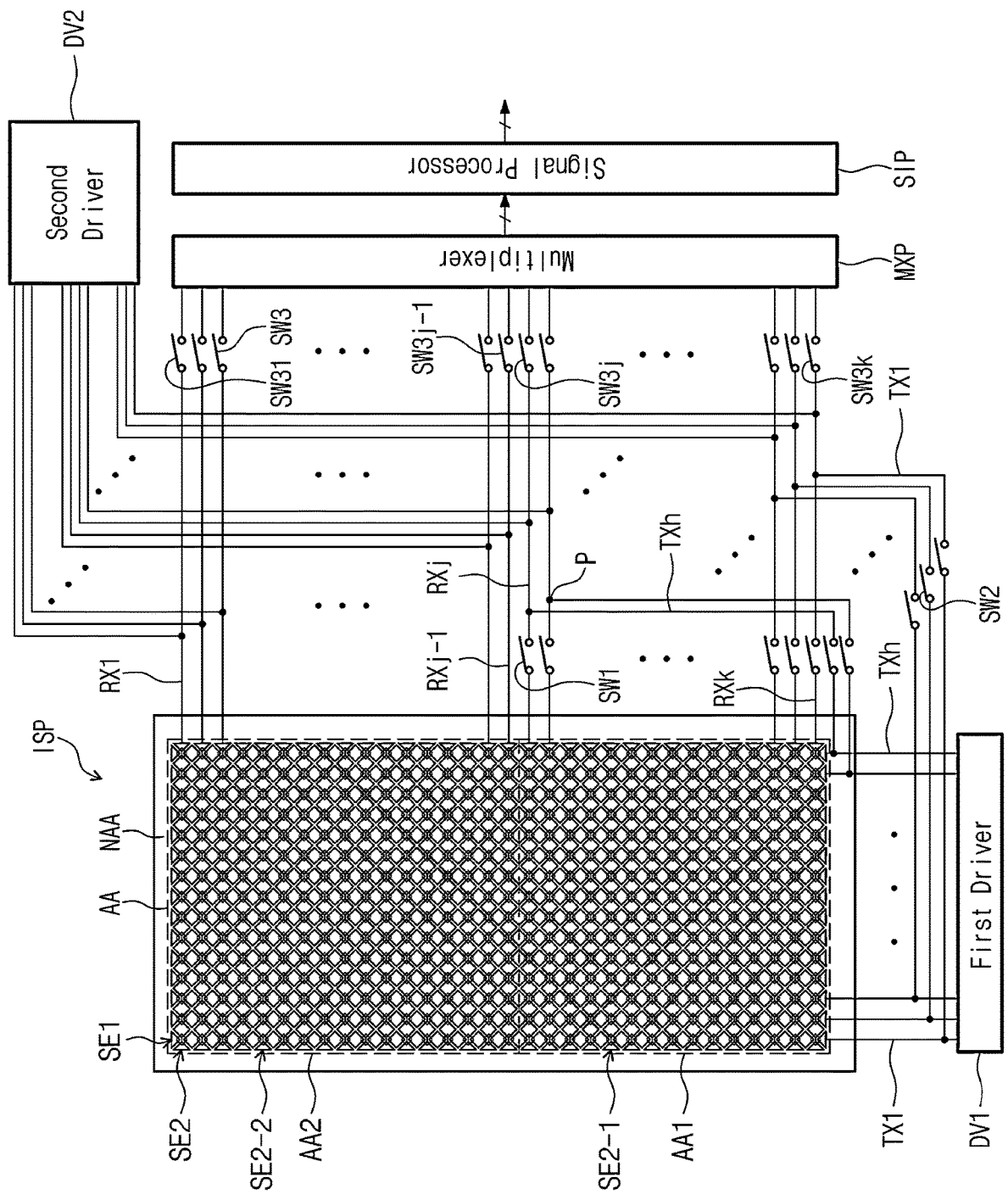
FIG. 8 is a view showing components of a sensing controller connected to first and second lines in FIG. 5.

FIG. 8 is a view showing some components of the sensing controller connected to the first and second lines of FIG. 5.

For the convenience of explanation, in FIG. 8, the non-active area NAA is illustrated to have a smaller size than that shown in FIG. 5, and the first lines TX1 to TXh and the second lines RX1 to RXk are illustrated to extend outside the non-active area NAA. In addition, the second lines RX1 to RXk are illustrated to extend in a right direction to be connected to components of the sensing controller.

Referring to FIG. 8, the sensing controller of the input sensing part ISP may include first and second drivers DV1 and DV2, first, second, and third switches SW1, SW2, and SW3, a multiplexer MXP, and a signal processor SIP.

The first lines TX1 to TXh may be connected to the first driver DV1. The second lines RX1 to RXk may be connected to the second driver DV2. The first driver DV1 and the second driver DV2 may apply driving signals to the first lines TX1 to TXh and the second lines RX1 to RXk, respectively.

The second lines RX1 to RXk may include a plurality of second-first lines RXj to RXk defined as j-th to k-th second lines RXj to RXk and a plurality of second-second lines RX1 to RXj−1 defined as first to (j−1)th second lines RX1 to RXj−1. As an example, j may be an integer greater than 1, and k may be an integer greater than j. The k-th second line RXk may be the last second line RXk. The second-first lines RXj to RXk may be disposed closer to the first lines TX1 to TXh than the second-second lines RX1 to RXj−1 are.

In the input sensing part ISP, an area in which the second-first lines RXj to RXk are disposed may be defined as a first area AA1, and an area in which the second-second lines RX1 to RXj−1 are disposed may be defined as a second area AA2. The second area AA2 may be defined adjacent to the first area AA1 in the first direction DR1. The second area AA2 may be spaced apart from the first lines TX1 to TXh to a greater extent than the first area AA1 are.

The second sensing electrodes SE2 may include a plurality of second-first sensing electrodes SE2-1 connected to the second-first lines RXj to RXk and a plurality of second-second sensing electrodes SE2-2 connected to the second-second lines RX1 to RXj−1. The second-first sensing electrodes SE2-4 may be adjacent to the second-second sensing electrodes SE2-2 in the first direction DR1.

The first lines TX1 to TXh may be connected to the second-first lines RXj to RXk. The first lines TX1 to TXh may be connected to the second-first lines RXj to RXk in a one-to-one correspondence. The number of the second-first lines RXj to RXk may be the same as the 221s number of the first lines TX1 to TXh. The second-first lines RXj to RXk may be defined as the second lines RXj to RXk respectively corresponding to the first lines TX1 to TXh among the second lines RX1 to RXk.

The first lines TX1 to TXh may be connected to the second-first lines RXj to RXk in a one-to-one correspondence in the order from the k-th second line RXk to the j-th second line RXj, however, this is merely one example. As an example, the first lines TX1 to TXh may be connected to the second-first lines RXj to RXk in a one-to-one correspondence in the order from the j-th second line RXj to the k-th second line RXk.

The first switches SW1 may be connected to the second-first lines RXj to RXk and the first lines TX1 to TXh. The first switches SW1 may be disposed between the first lines TX1 to TXh and the second-first sensing electrodes SE2-4 and may be respectively connected to the second-first lines RXj to RXk in series. The second-first lines RXj to RXk may be respectively connected to the second-first sensing electrodes SE2-4 via the first switches SW1.

Portions of the second-first lines RXj to RXk connected to the first lines TX1 to TXh may be defined as contact points P. The first switches SW1 may be connected to the second-first lines RXj to RXk in series between the contact points P and the second-first sensing electrodes SE2-1. The first switches SW1 may turn on or turn off the connection between the second-first lines RXj to RXk and the second-first sensing electrodes SE2-1. The first switches SW1 may turn on or turn off the connection between the second-first lines RXj to RXk and the first lines TX1 to TXh.

The second switches SW2 may be respectively connected to the first lines TX1 to TXh in series. The first lines TX1 to TXh may be respectively connected to the second-first lines RXj to RXk via the second switches SW2. The second switches SW2 may turn on or off the connection between the first lines TX1 to TXh and the second-first lines RXj to RXk.

The third switches SW3 may be connected to the second lines RX1 to RXk and the multiplexer MXP. First to (j−1)th third switches SW31 to SW3j-1 among the third switches SW3 may be respectively connected to the second-second lines RX1 to RXj−1 in series. Among the third switches SW3, j-th to k-th, third switches SW3j to SW3k may be respectively connected to the second-first lines RXj to RXk in series between the contact points P and the multiplexer MXP.

The multiplexer MXP may be selectively connected to some second lines among the second lines RX1 to RXk and may output a sensing signal. The signal processor SIP may be connected to the multiplexer MXP and may process the sensing signal provided from the multiplexer MXP. Operations of the multiplexer MXP and the signal processor SIP will be described in detail below.

Figure 9:
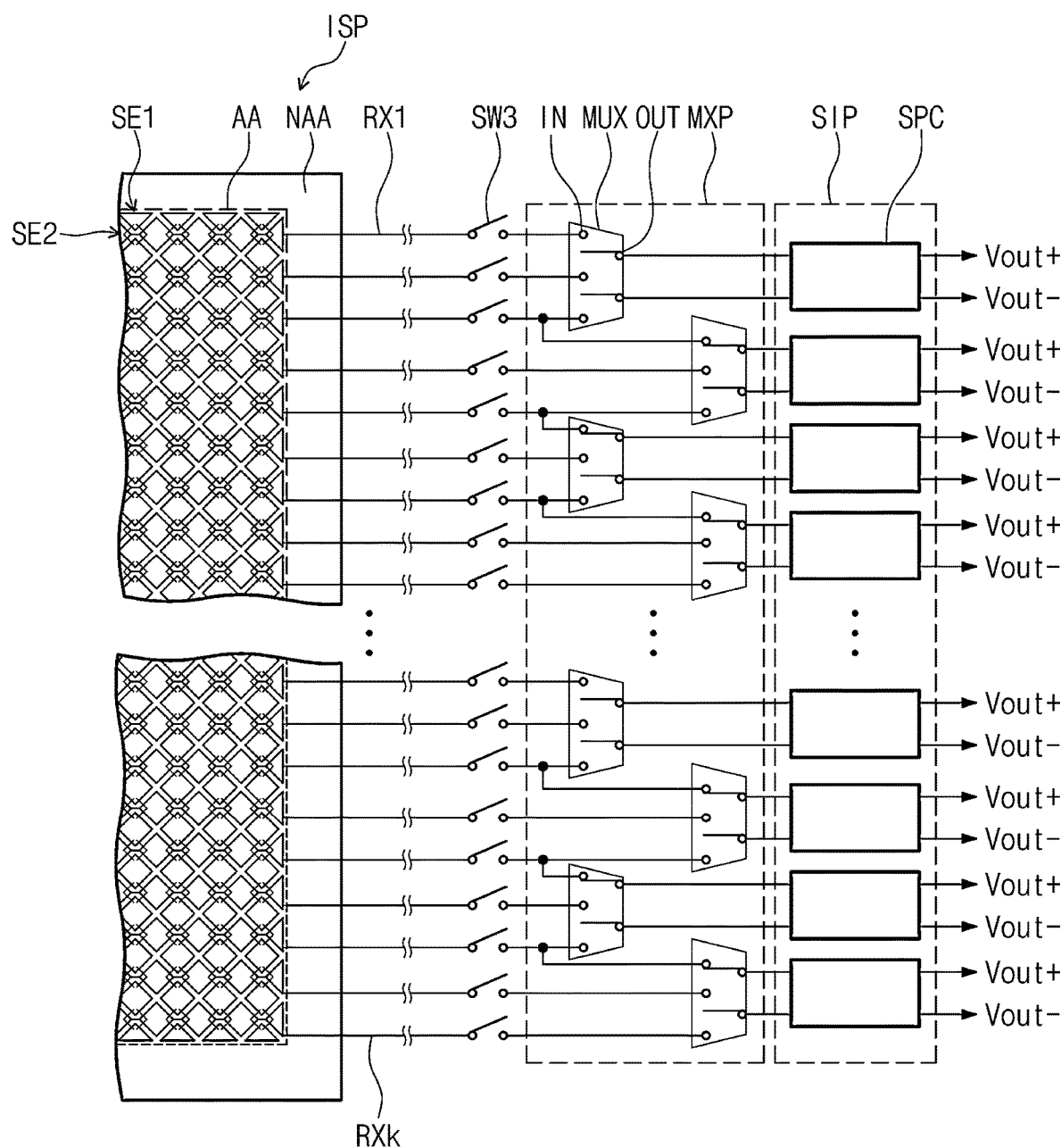
FIG. 9 is a view showing a multiplexer and a signal processor shown in FIG. 8.

FIG. 9 is a view showing the multiplexer MXP and the signal processor SIP shown in FIG. 8.

For example, FIG. 9 shows the first and second sensing electrodes SE1 and SE2 disposed at a right side of the input sensing part ISP, and the first lines TX1 to TXh and the first and second switches SW1 and SW2 are omitted.

Referring to FIG. 9, the multiplexer MXP may include a plurality of multiplexer circuits MUX. The multiplexer circuits MUX may be connected to the second lines RX1 to RXk. As an example, the third switches SW3 may be connected to the second lines RX1 to RXk and the multiplexer circuits MUX, and the multiplexer circuits MUX may be connected to the second lines RX1 to RXk via the third switches SW3. The j-th to k-th third switches SW3j to SW3k may be connected to the second-first lines RXj to RXk in series between the contact points P and the multiplexer circuits MUX.

Each of the multiplexer circuits MUX may be defined as a 3 to 2 (3:2) multiplexer. Each of the multiplexer circuits MUX may select two inputs among three inputs and may output two output signals. As an example, each of the multiplexer circuits MUX may include three input terminals IN and two output terminals OUT. The three input terminals IN may be connected to three corresponding third switches SW3 among the third switches SW3. The two output terminals OUT may be selectively connected to two input terminals IN among the three input terminals IN. This operation will be described in detail later.

The multiplexer circuits MUX may be consecutively connected to three second lines among the second lines RX1 to RXk and may consecutively share one second line. For example, the multiplexer circuits MUX may be consecutively connected to three third switches SW3 among the third switches SW3 and may share one third switch SW3.

An i-th multiplexer circuit MUX may be connected to (2i−1)th to (2i+1)th third switches SW3 to implement the above connection structure. Here, "i" is a positive integer. The three input terminals IN of the i-th multiplexer circuit MUX may be connected to the (2i−1)th to (2i+1)th third switches SW3. In a case where the "i" is 1, a first multiplexer circuit MUX may be connected to first to third, third switches SW3. In a case where the "i" is 2, a second multiplexer circuit MUX may be connected to the third to fifth, third switches SW3.

In this case, a first input terminal IN of an (i+1)th multiplexer circuit MUX may be connected to the third switch SW3 connected to a third input terminal IN of the i-th multiplexer circuit MUX. Accordingly, the first input terminal IN of the (i+1)th multiplexer circuit MUX and the third input terminal IN of the i-th multiplexer circuit MUX may be commonly connected to one third switch SW3.

The signal processor SIP may include a plurality of signal processing circuits SPC respectively connected to the multiplexer circuits MUX. The signal processing circuits SPC may be connected to two output terminals OUT of the multiplexer circuits MUX. The signal processing circuits SPC may process the sensing signals provided from the multiplexer circuits MUX to output the output signals Vout.

Figure 10:
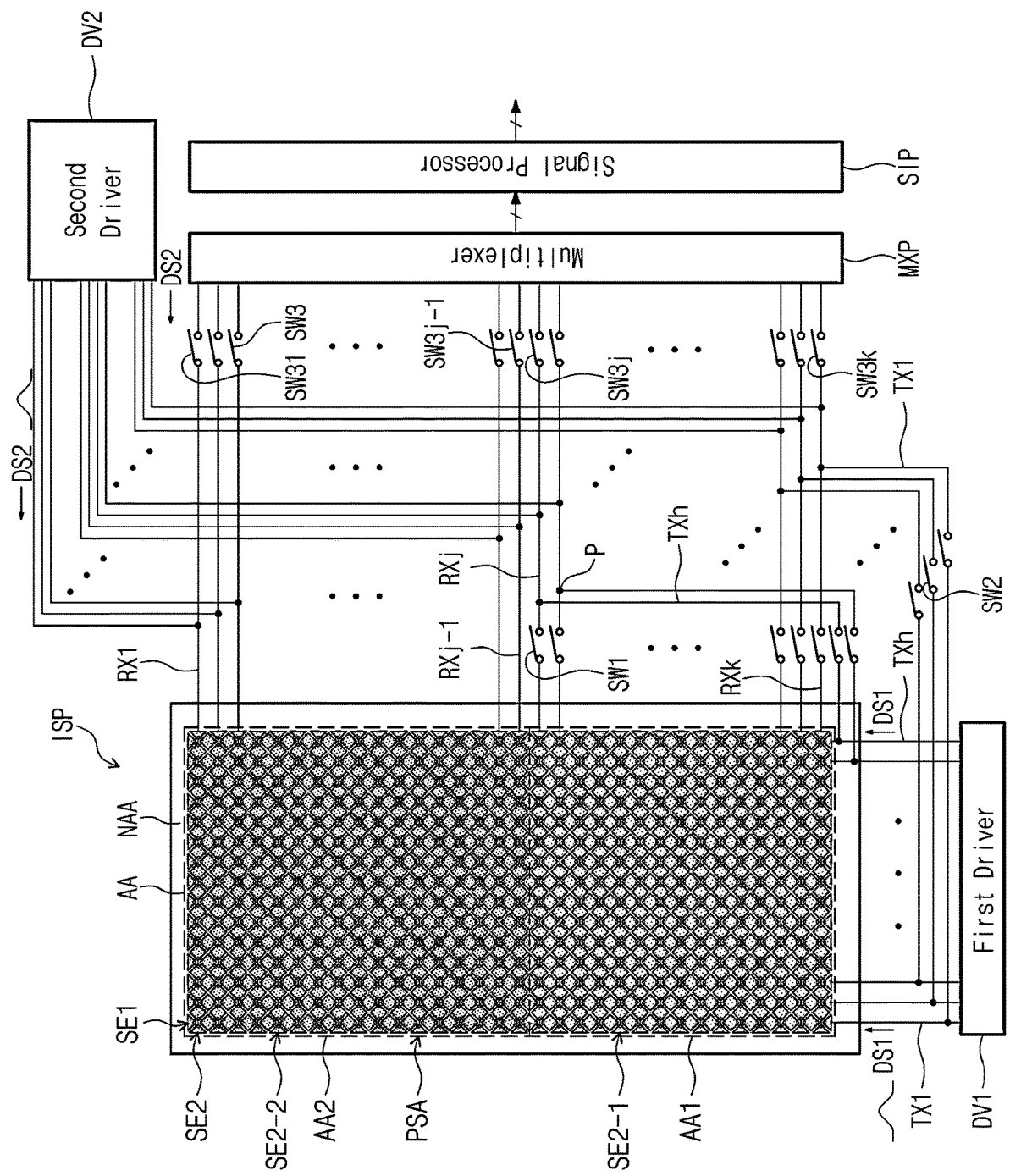
FIG. 10 is a view showing a driving operation of first and second sensing electrodes shown in FIG. 8.
Figure 11:
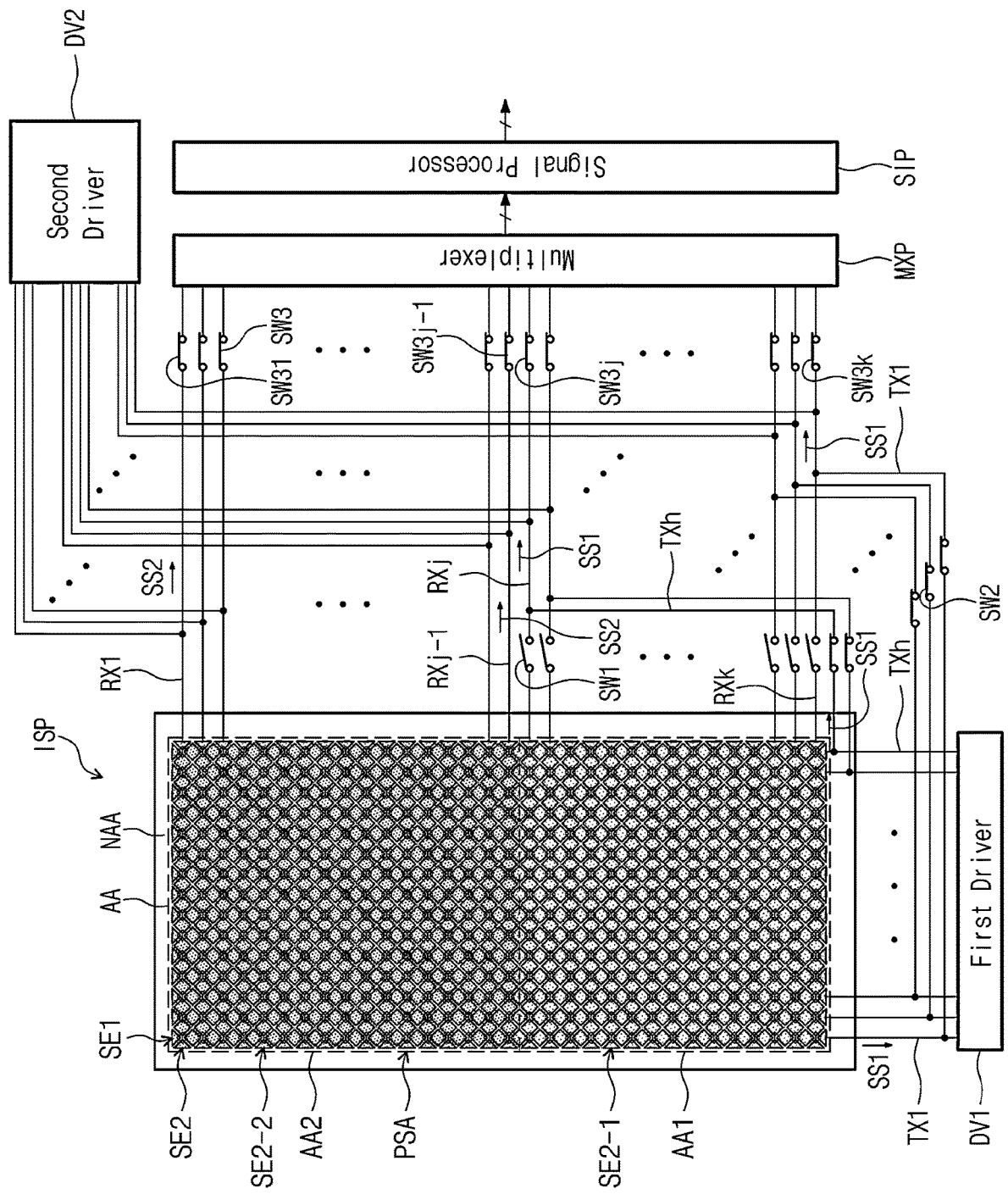
FIG. 11 is a view showing a sensing operation of first and second sensing electrodes shown in FIG. 8.

FIG. 10 is a view showing a driving operation of the first and second sensing electrodes SE1 and SE2 shown in FIG. 8. FIG. 11 is a view showing a sensing operation of the first and second sensing electrodes SE1 and SE2 shown in FIG. 8.

The driving operation and the sensing operation of the first and second sensing electrodes SE1 and SE2 shown in FIGS. 10 and 11 may be performed in a proximity sensing mode. The proximity sensing mode will be described in detail hereinafter.

Referring to FIG. 10, first driving signals DS1 may be output through the first driver DV1 in a driving mode. The first driving signals DS1 may be a sine wave. The first driving signals DS1 may be substantially simultaneously applied to the first lines TX1 to TXh. The first driving signals DS1 may be applied to the first sensing electrodes SE1 via the first lines TX1 to TXh.

The second driving signals DS2 may be output through the second driver DV2 in the driving mode. The second driving signals DS2 may be a sine wave. The second driving signals DS2 may be substantially simultaneously applied to the second lines RX1 to RXk. In addition, the first and second driving signals DS1 and DS2 may be substantially simultaneously applied to the first and second lines TX1 to TXh and RX1 to RXk.

Among the second driving signals DS2, the second driving signals DS2 applied to the second-first lines RXj to RXk may be applied to the second-first lines RXj to RXk between the contact points P and the j-th to k-th third switches SW3j to SW3k. Among the second driving signals DS2, the second driving signals DS2 applied to the second-second lines RX1 to RXj−1 may be applied to the second-second sensing electrodes SE2-2 via the second-second lines RX1 to RXj−1.

When the first and second driving signals DS1 and DS2 are applied to the first and second lines TX1 to TXh and RX1 to RXk, the first, second, and third switches SW1, SW2, and SW3 may be turned off. Since the first switches SW1 are turned off, the second driving signals DS2 applied to the second-first lines RXj to RXk might not be applied to the second-first sensing electrodes SE2-1.

Since the second switches SW2 are turned off, the first driving signals DS1 might not be applied to the second-first lines RXj to RXk. Since the third switches SW3 are turned off, the second driving signals DS2 might not be applied to the multiplexer MXP.

According to the operations described above, the first and second driving signals DS1 and DS2 may be substantially simultaneously applied to the first sensing electrodes SE1 and the second-second sensing electrodes SE2-2. The second driving signals DS2 might not be applied to the second-first sensing electrodes SE2-1. Accordingly, based on the second sensing electrodes SE2, the first area AA1 might not be driven, and the second area AA2 may be driven.

The first sensing electrodes SE1 and the second-second sensing electrodes SE2-2 may be driven by the first and second driving signals DS1 and DS2. In the second area AA2, the first sensing electrodes SE1 and the second-second sensing electrodes SE2-2 may be driven at the same time.

Referring to FIG. 11, in a sensing mode, the output from the first and second driving signals DS1 and DS2 may be interrupted, and the second and third switches SW2 and SW3 may be turned on. The first switches SW1 may be turned off.

First sensing signals SS1 sensed from the first sensing electrodes SE1 may be output through the first lines TX1 to TXh. The first sensing signals SS1 may be applied to the second-first lines RXj to RXk through the turned-on second switches SW2. Second sensing signals SS2 sensed from the second-second sensing electrodes SE2-2 may be output through the second-second lines RX1 to RXj−1.

The first and second driving signals DS1 and DS2 may be applied together to the first sensing electrodes SE1 and the second-second sensing electrodes SE2-2, and the first and second sensing signals SS1 and SS2 may be output together from the first sensing electrodes SE1 and the second-second sensing electrodes SE2-2.

The second area AA2 to which the first and second driving signals DS1 and DS2 are substantially simultaneously applied and from which the first and second sensing signals SS1 and SS2 are output together may be defined as a proximity sensing area PSA. The second area AA2 in which the first sensing electrodes SE1 and the second-second sensing electrodes SE2-2 are disposed together may be defined as the proximity sensing area PSA. The entire second area AA2 may be used as an area for a proximity sensing operation.

The first sensing signals SS1 and the second sensing signals SS2 may be applied to the third switches SW3 via the second lines RX1 to RXk. The first sensing signals SS1 and the second sensing signals SS2 may be applied to the multiplexer MXP via the turned-on third switches SW3. Accordingly, the first sensing electrodes SE1 and the second-second sensing electrodes SE2-2 may be driven together in the second area AA2, and the first and second sensing signals SS1 and SS2 may be output by the first sensing electrodes SE1 and the second-second sensing electrodes SE2-2.

Figure 12:
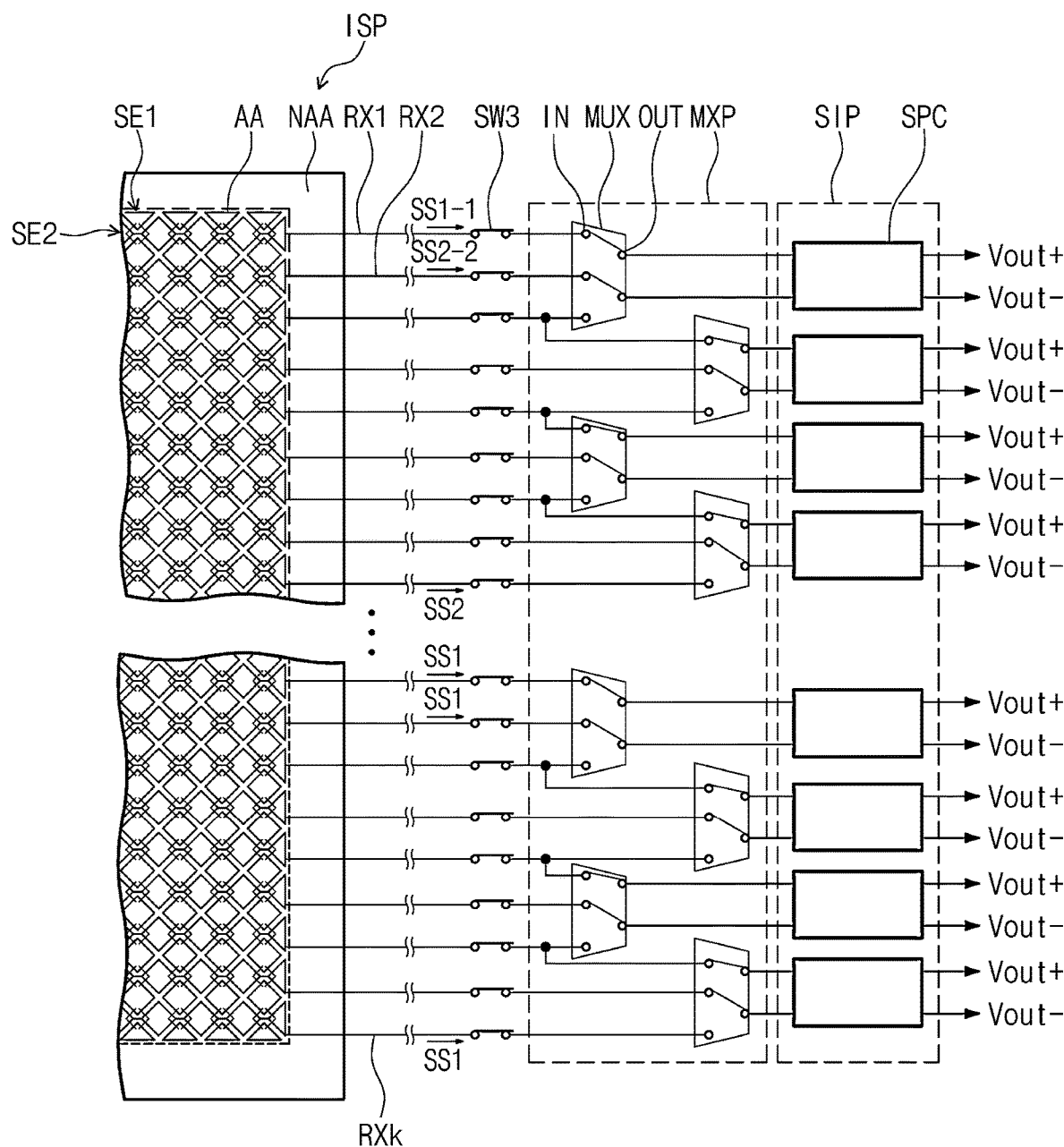
FIGS. 12 and 13 are views showing operations of the multiplexer and the signal processor, which process first and second sensing signals shown in FIG. 11.
Figure 13:
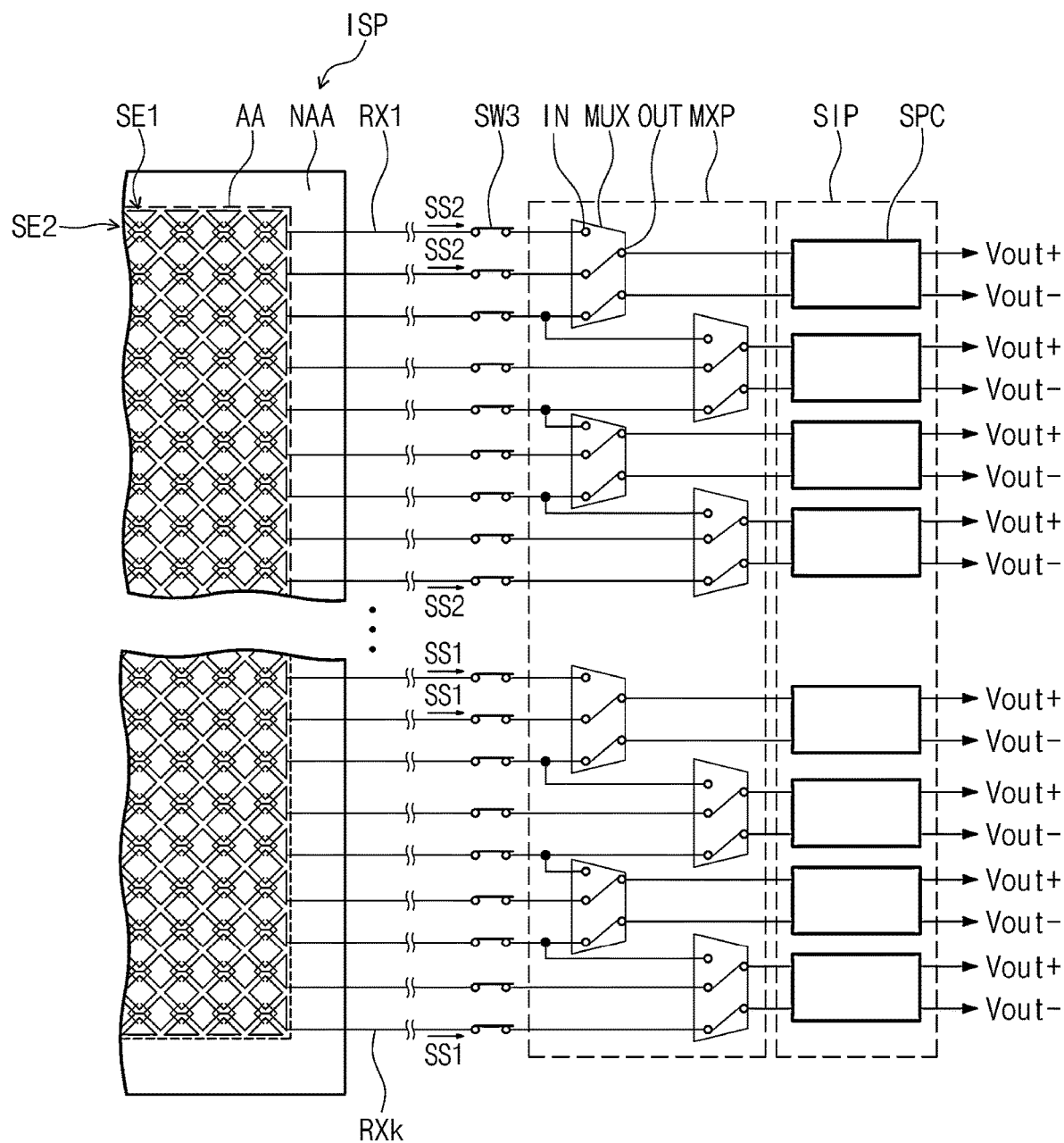

FIGS. 12 and 13 are views showing operations of the multiplexer MXP and the signal processor SIP, which process the first and second sensing signals SS1 and SS2 shown in FIG. 11.

Referring to FIGS. 12 and 13, the first and second sensing signals SS1 and SS2 may be applied to the multiplexer circuits MUX via the third switches SW3. The multiplexer circuits MUX may be operated in a first mode and a second mode.

Referring to FIG. 12, the two output terminals OUT of each of the multiplexer circuits MUX may be connected to the first and second input terminals IN among the three input terminals IN in the first mode. The two output terminals OUT may output the sensing signals that are input to the first and second input terminals IN in the first mode.

Referring to FIG. 13, the two output terminals OUT of each of the multiplexer circuits MUX may be connected to the second and third input terminals IN among the three input terminals IN in the second mode. The two output terminals OUT may output the sensing signals that are input to the second and third input terminals IN in the second mode.

Referring to FIGS. 12 and 13, the signal processing circuits SPC may process the sensing signals applied thereto from the two output terminals OUT of the multiplexer circuits MUX and may generate differential signals Vout+ and Vout−. In the case of second-first and second-second sensing signals SS2-1 and SS2-2 output from first and second second-second lines RX1 and RX2, for example, the second-first and second-second sensing signals SS2-1 and SS2-2 may be selected by a corresponding first multiplexer circuit MUX and may be applied to a corresponding first signal processing circuit SPC in the first mode.

The first signal processing circuit SPC may generate a value obtained by subtracting the second-second sensing signal SS2-2 from the second-first sensing signal SS2-1 as a first output signal and may generate a value obtained by subtracting the second-first sensing signal SS2-4 from the second-second sensing signal SS2-2 as a second output signal. One of the first and second output signals may be a positive output signal Vout+, and the other of the first and second output signals may be a negative output signal Vout−.

A sensing processing operation of the sensing controller may be performed based on a difference value between the positive output signal Vout+ and the negative output signal Vout−. The difference value between the positive output signal Vout+ and the negative output signal Vout− may be greater than a difference value between the second-first sensing signal SS2-1 and the second-second sensing signal SS2-2. As the difference value between the signals increases, the sensing processing operation may be easily performed.

Figure 14:
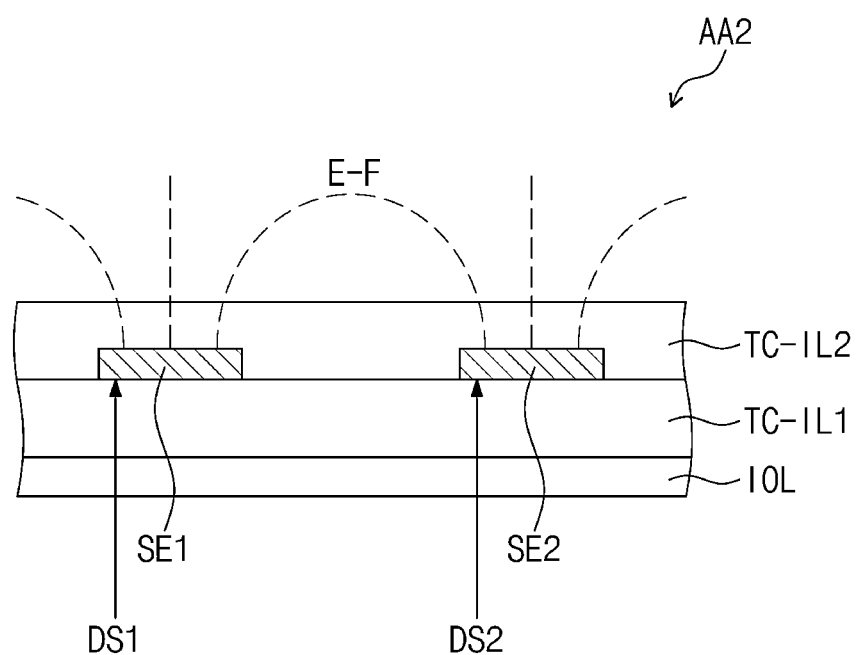
FIG. 14 is a cross-sectional view showing a first sensing electrode and a second sensing electrode adjacent to the first sensing electrode in a second area shown in FIG. 10.

FIG. 14 is a cross-sectional view showing the first sensing electrode SE1 and the second sensing electrode SE2 adjacent to the first sensing electrode SE2 in the second area AA2 shown in FIG. 10.

Referring to FIG. 14, in a case where the first driving signal DS1 and the second driving signal DS2 are substantially simultaneously applied to the first sensing electrode SE1 and the second sensing electrode SE2, an intensity of an electric field E-F formed in the first sensing electrode SE1 and the second sensing electrode SE2 may increase. The intensity of the electric field E-F may increase more when the first sensing electrode SE1 and the second sensing electrode SE2 are driven together than when only one of the first sensing electrode SE1 and the second sensing electrode SE2 is driven.

A touch sensitivity may increase as the intensity of the electric field E-F increases. In this case, the user's touch may be sensed not only when the user directly touches the display device DD but also when the user comes close to touching the display device DD. As an example, a proximity state of the user may be sensed when the user approaches close to the display device DD by a predetermined distance, without touching the display device DD.

Referring to FIGS. 10, 11, and 14, when the display device DD is incorporated into a telephone device, such as a mobile phone, the display device DD may operate in the proximity sensing mode in a call mode to receive a phone call or make a phone call. As an example, when receiving a phone call, the user may place the mobile phone close to his/her ear to talk over the mobile phone.

When the user places the mobile phone close to his/her ear, the input sensing part ISP may sense the proximity state of the user. In a case where the proximity state of the user is sensed, a predetermined event corresponding to the proximity sensing operation may be performed. As an example, since the user might not be looking directly at a display screen of the mobile phone when the user places the mobile phone close to the ear, the display screen may be tuned off, and thus, a power saving mode may be implemented.

When the user places the mobile phone close to his/her ear, the user may place an upper area of the mobile phone in which a speaker is disposed close to his/her ear. The first area AA1 may be defined as a lower area in which the speaker is not disposed, and the second area AA2 may be defined as the upper area in which the speaker is disposed.

The user may place the second area AA2 close to his/her ear rather than the first area AA1 for a phone call. According to an embodiment, when the display device DD is operated in the proximity sensing mode, the first and second sensing electrodes SE1 and SE2 may be driven together in the second area AA2, and thus, the intensity of the electric field may increase. As a result, the touch sensitivity of the second area AA2 may increase. In this case, when the user approaches the second area AA2 to talk over the mobile phone, the sensing operation may be operated not only when the user touches the second area AA2 but also the user approaches the second area AA2.

Accordingly, since the first area AA1 is less likely to be placed close to the user's ear in the call mode, the second driving signals DS2 might not be provided to the first area AA1. For example, since it is not necessary to increase the touch sensitivity of the first area AA1, the second driving signals DS2 might not be provided to the second-first sensing electrodes SE2-1 of the first area AA1.

When the user approaches the second area AA2, the first and second sensing signals SS1 and SS2 may be output, and the sensing controller may sense the proximity state of the user in response to the first and second sensing signals SS1 and SS2. Accordingly, when the proximity sensing mode is performed, the proximity state of the user may be sensed in the proximity sensing area PSA, and an event (the power saving mode) corresponding to the proximity state may be performed.

According to the embodiment, the proximity sensing mode may be performed by setting the second area AA2 of the input sensing part ISP as the proximity sensing area PSA and increasing the touch sensitivity of the proximity sensing area PSA without using a separate proximity sensor. Accordingly, since the separate proximity sensor is not used, a manufacturing cost of the display device DD may be reduced. As the touch sensitivity of the second area AA2 is increased, the proximity sensing mode may be easily performed.

Figure 15:
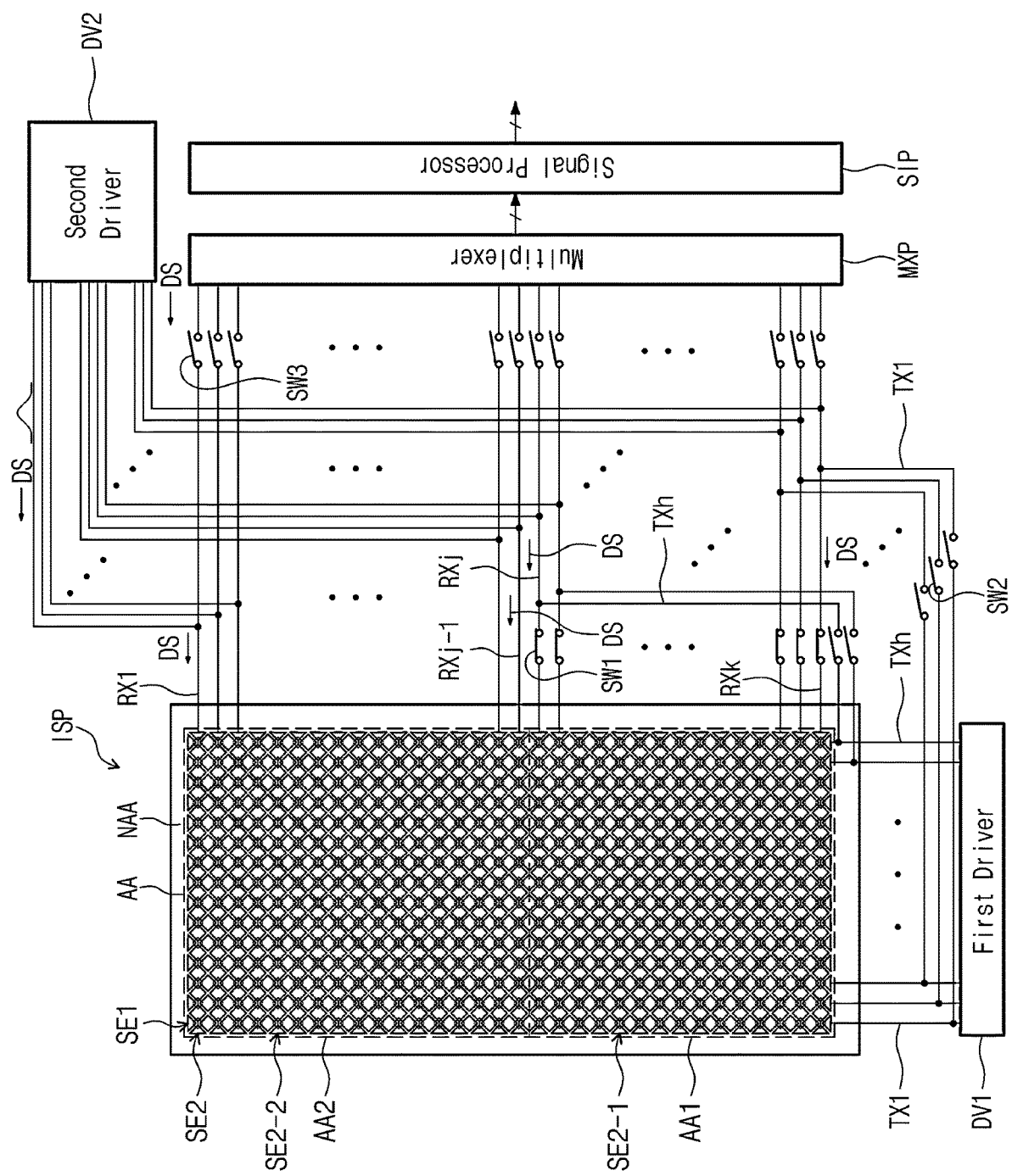
FIGS. 15 and 16 are views showing a self-sensing operation of an input sensing part shown in FIG. 8.
Figure 16:
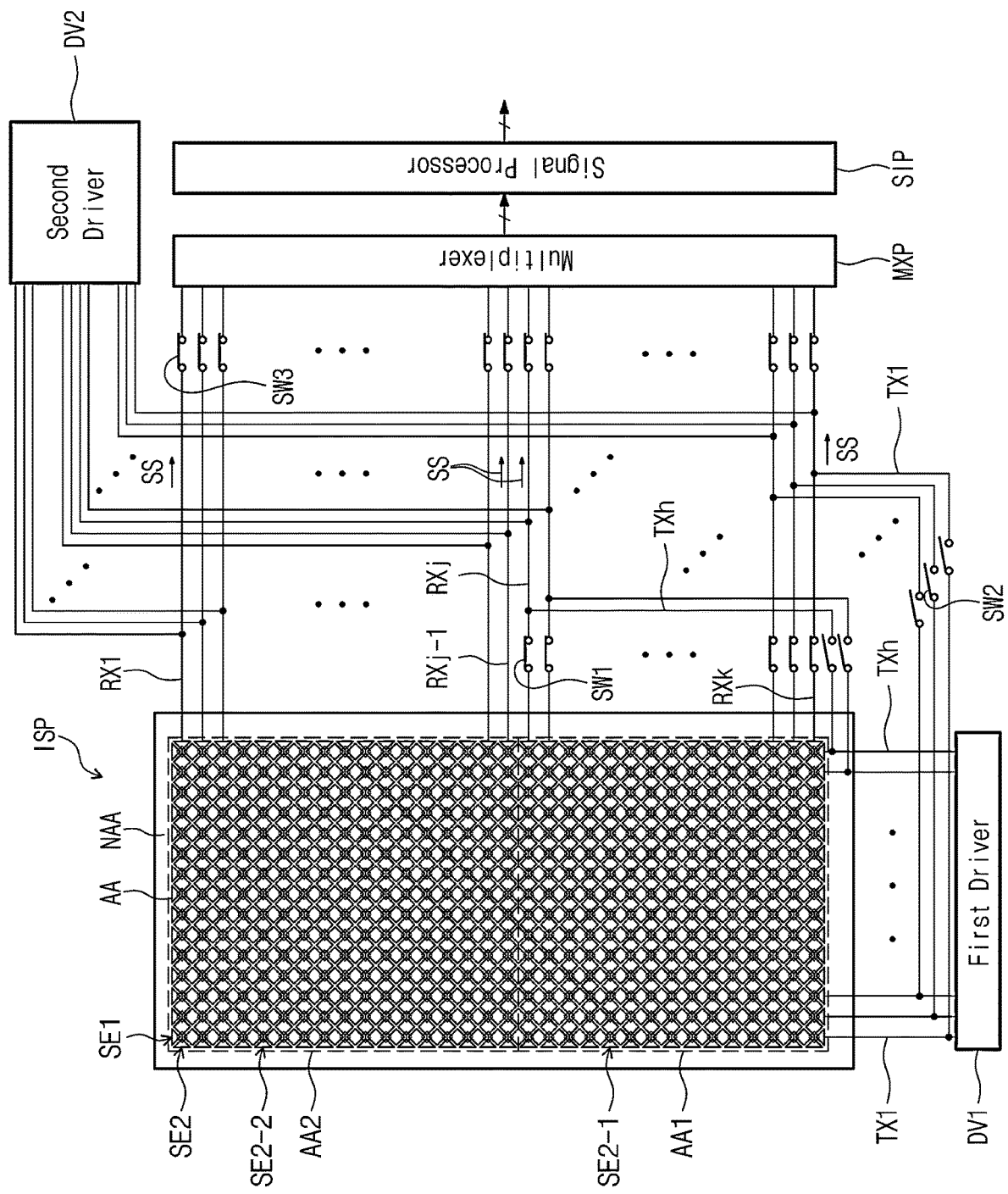

FIGS. 15 and 16 are views showing a self-sensing operation of the input sensing part ISP shown in FIG. 8.

Referring to FIG. 15, the input sensing part ISP may be operated in the self-sensing mode. In the driving mode of the self-sensing mode, the first switches SW1 may be turned on, the second switches SW2 may be turned off, and the third switches SW3 may be turned off.

In the driving mode, the second driver DV2 may apply the driving signals DS to the second lines RX1 to RXk. The driving signals DS may be a sine wave. The driving signals DS may be applied to the second sensing electrodes SE2 via the second lines RX1 to RXk.

Referring to FIG. 16, in the sensing mode of the self-sensing mode, the first switches SW1 may be turned on, the second switches SW2 may be turned off, and the third switches SW3 may be turned on. The sensing signals SS may be applied to the multiplexer MXP via the second lines RX1 to RXk. The self-sensing operation of the input sensing part ISP may be performed by the above-described operations.

Figure 17:
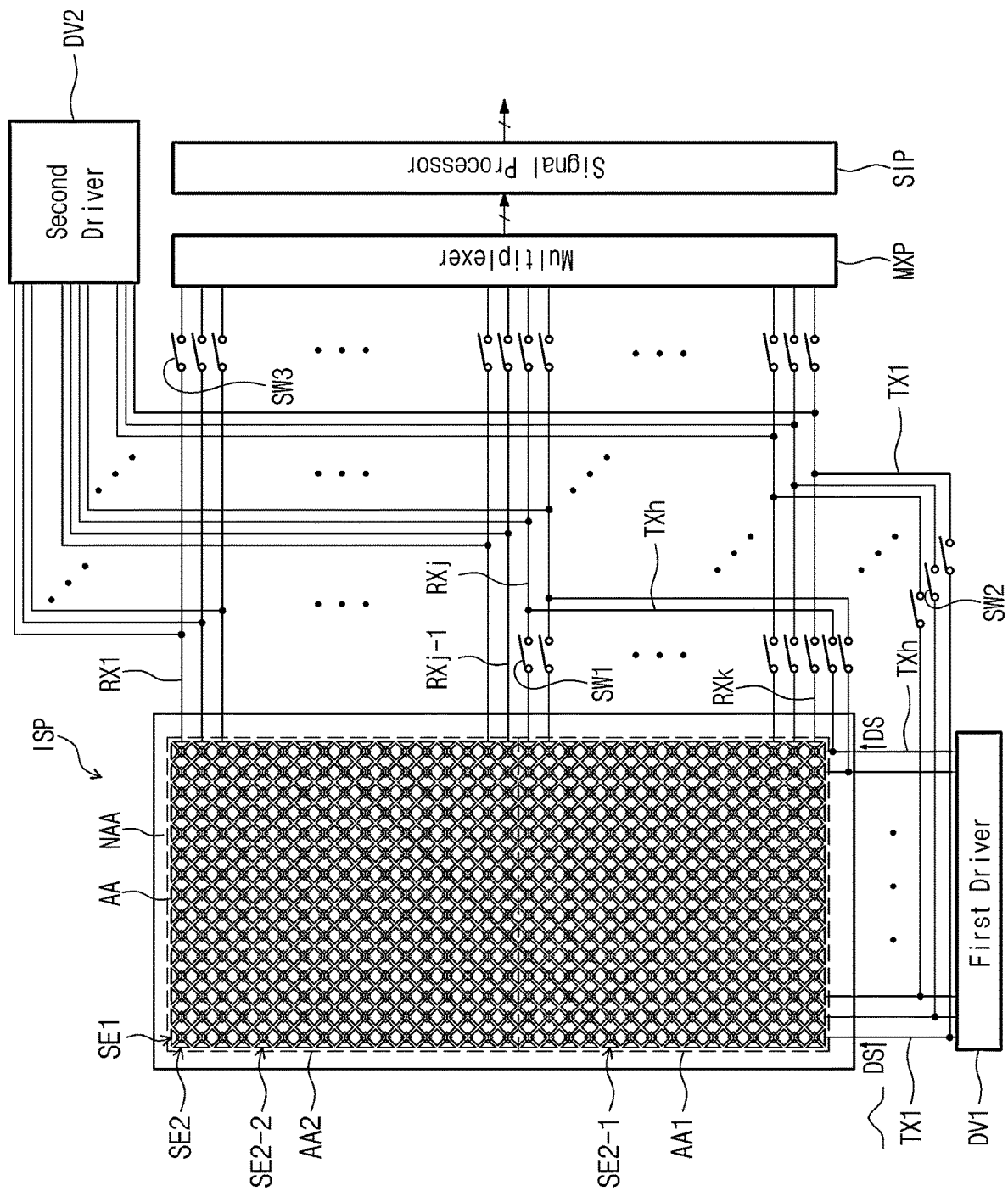
FIGS. 17 and 18 are views showing a mutual sensing operation of an input sensing part shown in FIG. 8.
Figure 18:
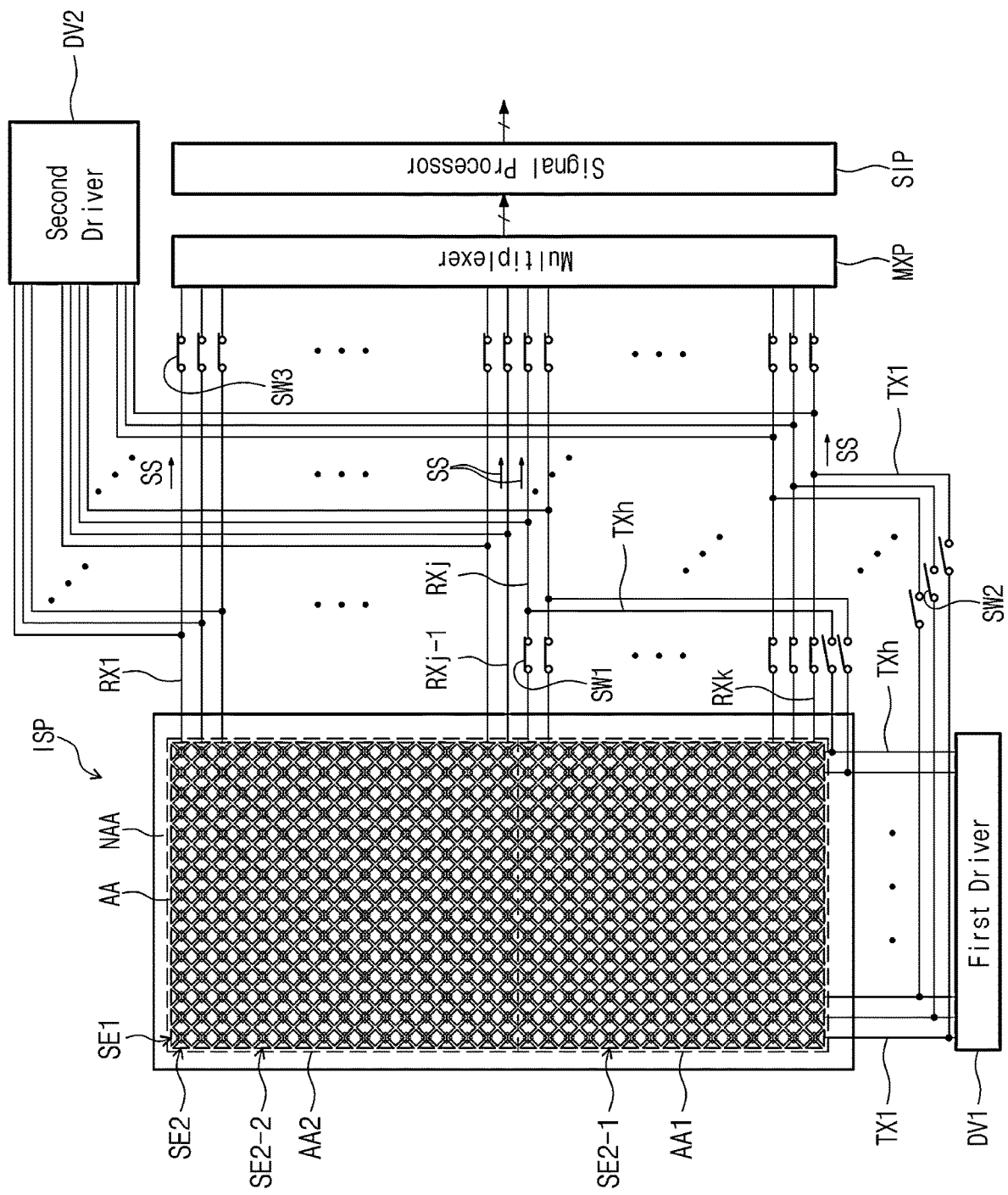

FIGS. 17 and 18 are views showing a mutual sensing operation of the input sensing part ISP shown in FIG. 8.

Referring to FIG. 17, the input sensing part ISP may be operated in a mutual sensing mode. In the driving mode of the mutual sensing mode, the first switches SW1 may be turned off, the second switches SW2 may be turned off, and the third switches SW3 may be turned off.

In the driving mode, the first driver DV1 may apply the driving signals DS to the first lines TX1 to TXh. The driving signals DS may be applied to the first sensing electrodes SE1 via the first lines TX1 to TXh.

Referring to FIG. 18, in the sensing mode of the mutual sensing mode, the first switches SW1 may be turned on, the second switches SW2 may be turned off, and the third switches SW3 may be turned on. The sensing signals SS may be applied to the multiplexer MXP via the second lines RX1 to RXk. The mutual sensing operation of the input sensing part ISP may be performed by the above-described operations.

Figure 19:
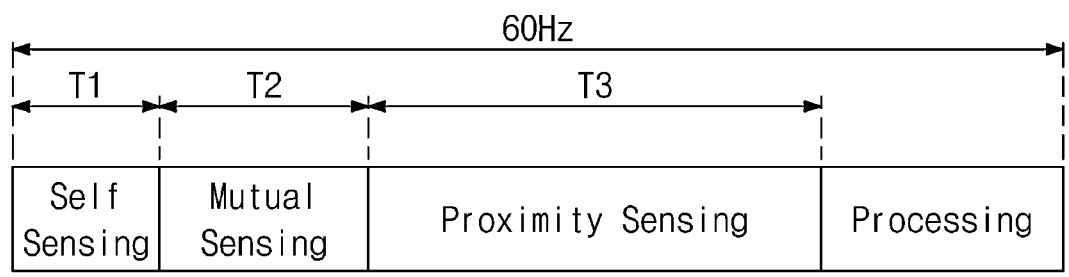
FIG. 19 is a view showing an operation section of a proximity sensing mode, a self-sensing mode, and a mutual sensing mode, which are described in FIGS. 10, 11, and 15 to 18.

FIG. 19 is a view showing an operation section of the proximity sensing mode, the self-sensing mode, and the mutual sensing mode, which are described in FIGS. 10, 11, and 15 to 18.

Referring to FIG. 19, the first and second sensing electrodes SE1 and SE2 of the input sensing part ISP may be driven in the self-sensing mode, the mutual sensing mode, and the proximity sensing mode. A processing mode may be defined as a mode in which an event operation according to a touch is performed. According an embodiment, an operation frequency of the input sensing part ISP may be about 60 Hz.

The operation section of the self-sensing mode may be referred to as a first section T1, the operation section of the mutual sensing mode may be referred to as a second section T2, and the operation section of the proximity sensing mode may be referred to as a third section T3. The third section T3 may be longer than the first and second sections T1 and T2. The second section T2 may be longer than the first section T1.

As the third section T3 is set to be the longest, the proximity sensing mode may be sufficiently performed in the call mode. For example, since a time required to perform the proximity sensing mode is sufficiently secured, the proximity sensing mode may be normally performed.

Figure 20:
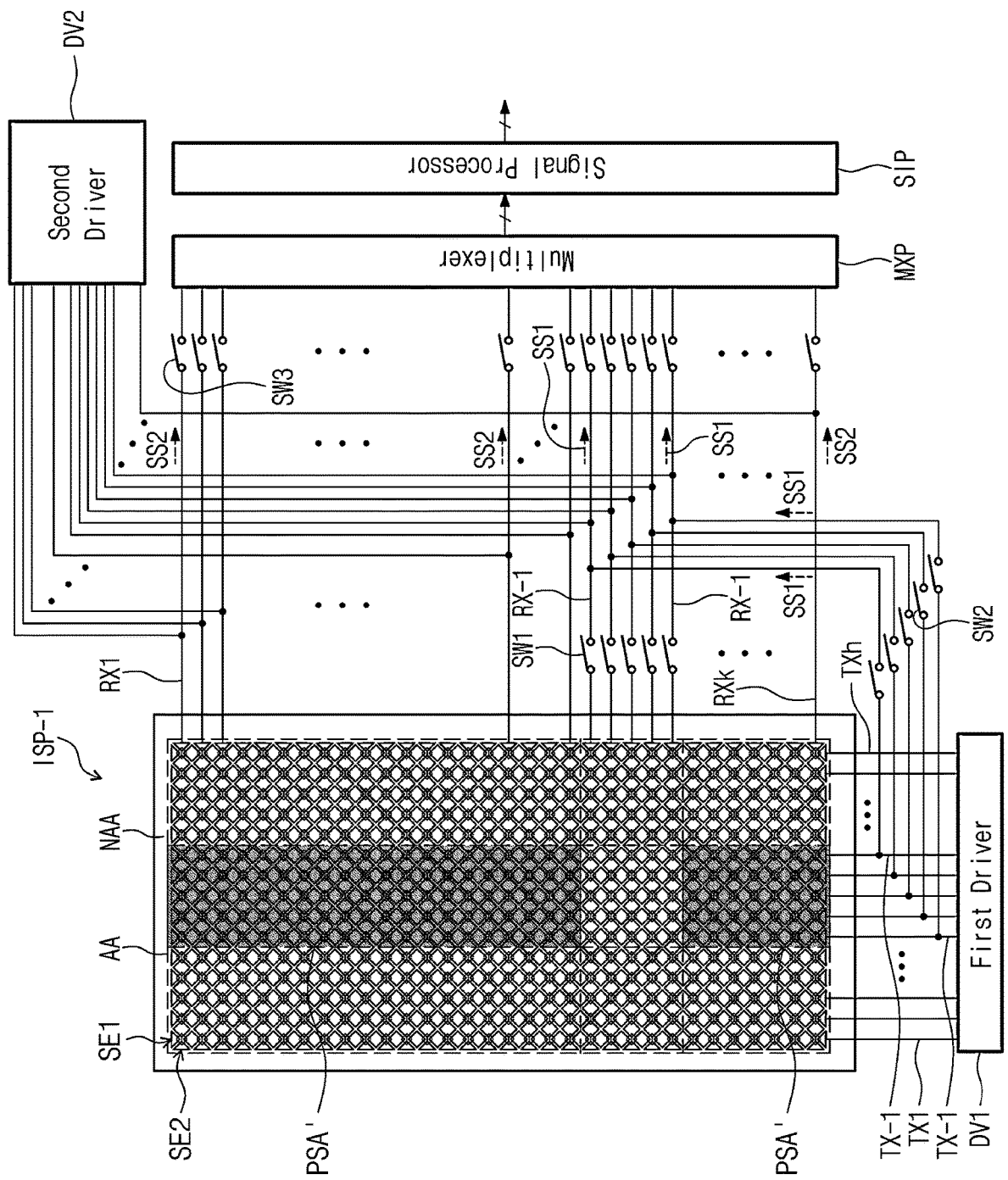
FIG. 20 is a view showing a configuration of an input sensing part according to an embodiment of the present disclosure.

FIG. 20 is a view showing a configuration of an input sensing part ISP-1 according to an embodiment of the present disclosure.

Hereinafter, details of the input sensing part ISP-1 of FIG. 20 will be described focusing on features different from those of the input sensing part ISP of FIG. 8.

Referring to FIG. 20, g first lines TX-1 among first lines TX1 to TXh may be connected to g second lines RX-1 among second lines RX1 to RXk, respectively. Here, g is a positive integer, and g may be smaller than the number of the first lines TX1 to TXh. The g second lines RX-1 may be the second lines RX-1 disposed under the input sensing part ISP-1 among the second lines RX1 to RXk.

As an example, five first lines TX-1 are connected to five second lines RX-1, however, the number of the first lines TX-1 and the number of the second lines RX-1 connected to the first lines TX-1 should not necessarily be limited to five as long as g is smaller than the number of the first lines TX1 to TXh. As an example, the arbitrary number of the first lines TX-1 between a first, first line TX1 and an h-th first line TXh are set as the g first lines TX-1, however, the present disclosure should not necessarily be limited thereto or thereby.

A predetermined number of the first lines starting from the first, first line TX1 in ascending order may be set as the g first lines TX-1, or a predetermined number of the first lines starting from the h-th first line TXh, which is the last first line, in descending order may be set as the g first lines TX-1. For example, among the first lines TX1 to TXh, the first lines disposed at various locations may be set as the g first lines TX-1. Similarly, among the second lines RX1 to RXk, the second lines disposed at various locations may be set as the g second lines RX-1.

First switches SW1 may be respectively connected to the g second lines RX-1. Second switches SW2 may be respectively connected to the g first lines TX-1.

In the proximity sensing mode, similar to FIGS. 10 and 11, the second and third switches SW2 and SW3 may be turned on after first and second driving signals DS1 and DS2 are applied, and then first and second sensing signals SS1 and SS2 may be output.

The first sensing signals SS1 may be output via the g first lines TX-1, and the second sensing signals SS2 may be output via the second lines except the g second lines RX-1. An area to which the first and second driving signals DS1 and DS2 are applied and from which the first and second sensing signals SS1 and SS2 are output together may be defined as a proximity sensing area PSA'.

An area in which the second lines except the g second lines RX-1 and the g first lines TX-1 are disposed together may be defined as the proximity sensing area PSA'.

In the input sensing part ISP shown in FIGS. 10 and 11, the first sensing signals SS1 may be output via the first lines TX1 to TXh after the first driving signals DS1 are applied to the first lines TX1 to TXh. However, the first sensing signals SS1 may be output via some first lines TX-1 among the first lines TX1 to TXh in the input sensing part ISP-1 of FIG. 20.

As described in FIGS. 10 and 11, the entire second area AA2 may be set as the proximity sensing area PSA, however, the present disclosure should not necessarily be limited thereto or thereby. As shown in FIG. 20, since the first sensing signals SS1 are output via some first lines TX-1, the proximity sensing area PSA' may be differently set. For example, according to an embodiment, the proximity sensing area may be set in various different ways.

Figure 21A:
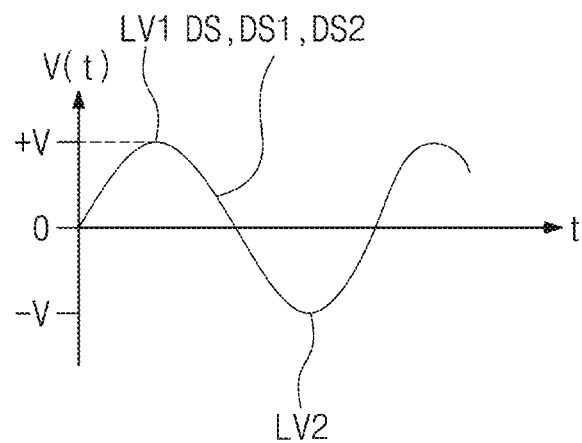
FIG. 21A is a view showing waveforms of driving signals and first and second driving signals shown in FIGS. 10, 15, and 17.
Figure 21B:
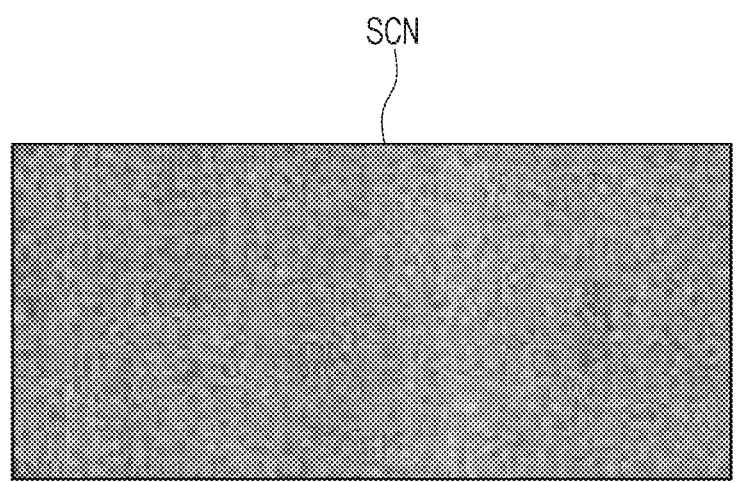
FIG. 21B is a view showing a screen of a display panel according to the driving signals and the first and second driving signals shown in FIG. 21A.

FIG. 21A is a view showing waveforms of the driving signals DS and the first and second driving signals DS1 and DS2 shown in FIGS. 10, 15, and 17. FIG. 21B is a view showing a screen of a display panel according to the driving signals DS and the first and second driving signals DS1 and DS2 shown in FIG. 21A.

Figure 22A:
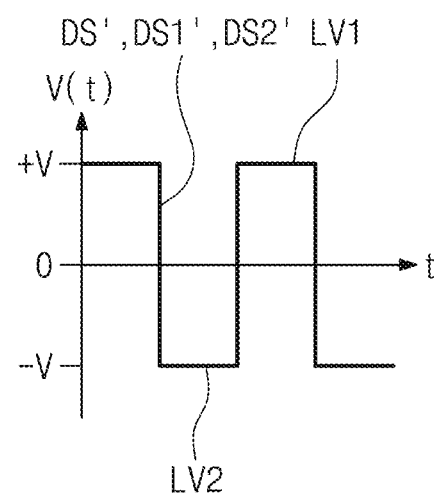
FIG. 22A is a view showing waveforms of driving signals and first and second driving signals according to an embodiment.
Figure 22B:
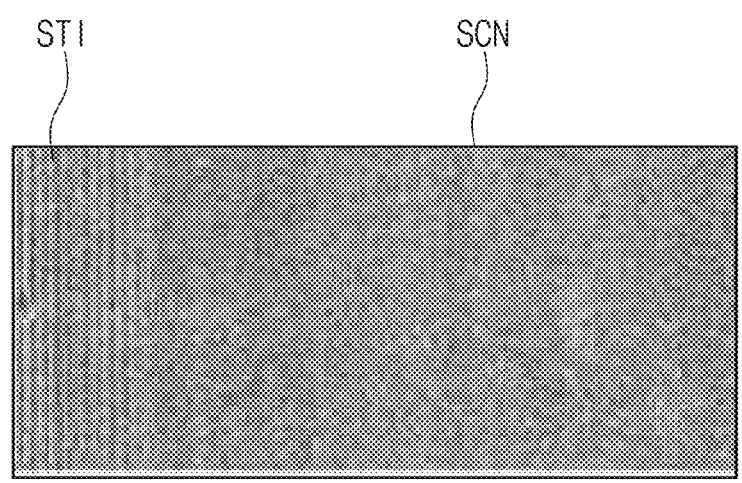
FIG. 22B is a view showing a screen of a display panel according to the driving signals and the first and second driving signals shown in FIG. 22A.

FIG. 22A is a view showing waveforms of driving signals DS' and first and second driving signals DS1' and DS2' according to an embodiment. FIG. 22B is a view showing a screen of a display panel according to the driving signals DS' and the first and second driving signals DS1' and DS2' shown in FIG. 22A.

Referring to FIGS. 21A and 21B, when the driving signals DS and the first and second driving signals DS1 and DS2 are the sine wave, levels of the driving signals DS and the first and second driving signals DS1 and DS2 may gradually decrease from a first level LV1 to a second level LV2 or may gradually increase from the second level LV2 to the first level LV1. In this case, abnormal images such as a stripe pattern might not be displayed on a screen SCN, and normal images may be displayed.

Referring to FIGS. 22A and 22B, when the driving signals DS' and the first and second driving signals DS1' and DS2' are a square wave, levels of the driving signals DS' and the first and second driving signals DS1' and DS2' may be instantly changed to a second level LV2 from a first level LV1 or may be instantly changed to the first level LV1 from the second level LV2. For example, the driving signals DS' and the first and second driving signals DS1' and DS2 may be rapidly changed.

In this case, levels of signals applied to a display panel DP may be influenced by the driving signals DS' and the first and second driving signals DS1' and DS2'. As an example, the levels of the signals applied to the display panel DP may be changed due to a coupling phenomenon of the driving signals DS' and the first and second driving signals DS1' and DS2' in which the levels are rapidly changed. As a result, as shown in FIG. 22B, the abnormal images such as the stripe pattern may be visible in images displayed on a screen SCN.

According to an embodiment, since sine wave signals are used as the driving signals DS and the first and second driving signals DS1 and DS2, the stripe pattern shown in FIG. 22B might not be observable, and the normal images may be displayed as shown in FIG. 21B.

Although embodiments of the present disclosure have been described, it is understood that the present disclosure should not necessarily be limited to these embodiments but various changes and modifications can be made by one ordinary skilled in the art within the spirit and scope of the present disclosure.

What is claimed is:

1. A display device, comprising:
 a display panel; and
 an input sensing part disposed on the display panel, the input sensing part comprising:
  a plurality of first sensing electrodes, each of which extending in a first direction and arranged in a second direction crossing the first direction;
  a plurality of first lines connected to the plurality of first sensing electrodes;
  a plurality of second sensing electrodes, each of which extending in the second direction and arranged in the first direction; and
  a plurality of second lines connected to the plurality of second sensing electrodes,
  wherein the plurality of second lines comprises a plurality of second-first lines defined as j-th to k-th second lines and a plurality of second-second lines defined as a first to (j−1)th second lines,
  wherein each of the plurality of first lines is connected to each of the plurality of second-first lines and none of the plurality of first lines are connected to any of the plurality of second-second lines, and
  wherein j is an integer greater than 1, and k is an integer greater than j.

2. The display device of claim 1, wherein the k-th second line is a last second line.

3. The display device of claim 1, wherein a number of the plurality of second-first lines is equal to a number of the plurality of first lines.

4. The display device of claim 1, wherein each of the plurality of first lines is connected to the plurality of second-first lines in a one-to-one correspondence to from the k-th second line to the j-th second line.

5. The display device of claim 1, further comprising:
 a plurality of first switches connected to the plurality of second-first lines and the plurality of first lines; and
 a plurality of second switches connected to the plurality of first lines in series.

6. The display device of claim 5, wherein the plurality of second lines comprises a plurality of second-second lines defined as first to (j−1)th second lines, the plurality of second sensing electrodes comprises:
 a plurality of second-first sensing electrodes connected to the plurality of second-first lines; and
 a plurality of second-second sensing electrodes connected to the plurality of second-second lines, and
 wherein the plurality of first switches is connected to the plurality of second-first lines in series between contact points of each of the plurality of second-first lines to which the plurality of first lines is connected and the plurality of second-first sensing electrodes.

7. The display device of claim 6, further comprising:
 a plurality of multiplexer circuits; and
 a plurality of third switches connected to the plurality of second lines and the plurality of multiplexer circuits.

8. The display device of claim 7, wherein j-th to k-th third switches are connected to the plurality of second-first lines in series between the contact points and the plurality of multiplexer circuits.

9. The display device of claim 7, wherein each of the plurality of multiplexer circuits comprises:
three input terminals connected to corresponding three third switches among the plurality of third switches; and
two output terminals selectively connected to two input terminals among the plurality of three input terminals.

10. The display device of claim 9, wherein three input terminals of an i-th multiplexer circuit of the plurality of multiplexer circuits are connected to (2i−1)th to (2i+1)th third switches of the plurality of third switches, wherein i is a positive integer.

11. The display device of claim 9, wherein the two output terminals are connected to first and second input terminals among the three input terminals in a first mode and are connected to the second input terminal and a third input terminal among the three input terminals in a second mode.

12. The display device of claim 7, further comprising a plurality of signal processing circuits respectively connected to each of the plurality of multiplexer circuits, wherein each of the plurality of signal processing circuits outputs a positive output signal and a negative output signal.

13. The display device of claim 7, wherein first and second driving signals are substantially simultaneously applied to the plurality of first lines and the plurality of second lines, respectively, when the first driving signals are applied to the plurality of first lines and the second driving signals are applied to the plurality of second lines, and the second driving signals applied to the plurality of second-first lines among the second driving signals are applied to the plurality of second-first lines between the contact points and the j-th to k-th third switches.

14. The display device of claim 13, wherein the first, second, and third switches are turned off when the first and second driving signals are applied to the plurality of first lines and the plurality of second lines, respectively.

15. The display device of claim 13, wherein the second and third switches are turned on when first sensing signals are output through the plurality of first lines and second sensing signals are output through the plurality of second-second lines.

16. The display device of claim 6, wherein the plurality of first sensing electrodes and the plurality of second sensing electrodes are operated in a self-sensing mode, a mutual sensing mode, and a proximity sensing mode, and the proximity sensing mode is longer than either the self-sensing mode or the mutual sensing mode.

17. The display device of claim 16, wherein the plurality of first sensing electrodes and the plurality of second-second sensing electrodes are driven together in an area in which the plurality of second-second sensing electrodes are disposed, and sensing signals are output by the plurality of first sensing electrodes and the plurality of second-second sensing electrodes.

18. The display device of claim 16, wherein each of the plurality of first switches are turned on when the plurality of second sensing electrodes are driven in the self-sensing mode, each of the plurality of first switches are turned off when driving signals are applied to the plurality of first sensing electrodes through the plurality of first lines in the mutual sensing mode, each of the plurality of first switches are turned on when sensing signals are output from the plurality of second sensing electrodes in the mutual sensing mode, and each of the plurality of second switches are turned off.

19. A display device, comprising:
a display panel; and
an input sensing part disposed on the display panel, the input sensing part comprising:
a plurality of first sensing electrodes, each of which extending in a first direction and arranged in a second direction crossing the first direction;
a plurality of first lines connected to the plurality of first sensing electrodes;
a plurality of second sensing electrodes, each of which extending in the second direction and arranged in the first direction; and
a plurality of second lines connected to the plurality of second sensing electrodes, wherein each of the plurality of first lines are respectively connected to a first set of second lines among the plurality of second lines, and none of the plurality of first lines are connected to any of a second set of second lines among the plurality of second lines.

20. A display device, comprising:
a display panel; and
an input sensing part disposed on the display panel, the input sensing part comprising:
a plurality of first sensing electrodes, each of which extending in a first direction and arranged in a second direction crossing the first direction;
a plurality of first lines connected to the plurality of first sensing electrodes;
a plurality of second sensing electrodes, each of which extending in the second direction, arranged in the first direction, and insulated from the plurality of first sensing electrodes while crossing the plurality of first sensing electrodes; and
a plurality of second lines connected to the plurality of second sensing electrodes,
wherein the plurality of second lines comprises a plurality of second-first lines defined as j-th to k-th second lines and a plurality of second-second lines defined as a first to (j−1)th second lines,
wherein the plurality of second sensing electrodes comprises:
a plurality of second-first sensing electrodes disposed in a first area and connected to the plurality of second-first lines; and
a plurality of second-second sensing electrodes disposed in a second area adjacent to the first area in the first direction and connected to the plurality of second-second lines,
wherein driving signals are substantially simultaneously applied to the plurality of first sensing electrodes and the plurality of second-second sensing electrodes in a proximity sensing mode, and the driving signals are not applied to the second-first sensing electrodes in the proximity sensing mode,
wherein each of the plurality of first lines is connected to each of the plurality of second-first lines and none of the plurality of first lines are connected to any of the plurality of second-second lines, and
wherein j is an integer greater than 1, and k is an integer greater than j.

* * * * *